(12) United States Patent
Zhang et al.

(10) Patent No.: US 11,553,221 B2
(45) Date of Patent: Jan. 10, 2023

(54) VIDEO TRANSMISSION METHOD AND SYSTEM AND DEVICE

(71) Applicant: Huawei Technologies Co., Ltd., Shenzhen (CN)

(72) Inventors: Jinhui Zhang, Nanjing (CN); Meng Liu, Shenzhen (CN); Hongguang Guan, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 16/727,534

(22) Filed: Dec. 26, 2019

(65) Prior Publication Data

US 2020/0137428 A1  Apr. 30, 2020

Related U.S. Application Data

(63) Continuation of application No. PCT/CN2018/084959, filed on Apr. 27, 2018.

(30) Foreign Application Priority Data

Jun. 27, 2017 (CN) .......................... 201710503244.5

(51) Int. Cl.
*H04N 21/234* (2011.01)
*H04N 21/236* (2011.01)
(Continued)

(52) U.S. Cl.
CPC ......... *H04N 21/2343* (2013.01); *H04L 47/32* (2013.01); *H04N 21/236* (2013.01);
(Continued)

(58) Field of Classification Search
CPC .... H04L 47/32; H04N 21/236; H04N 21/434; H04N 21/4402; H04N 21/643
See application file for complete search history.

(56) References Cited

U.S. PATENT DOCUMENTS 8,363,548 B1 * 1/2013 Aboul-Magd .......... H04L 47/32
370/235
2004/0027991 A1 * 2/2004 Jang ...................... H04L 1/1809
370/230
(Continued)

FOREIGN PATENT DOCUMENTS

CN          1468001 A     1/2004
CN        101098173 A     1/2008
(Continued)

OTHER PUBLICATIONS

Machine Translation and Abstract of Chinese Publication No. CN1468001, Jan. 14, 2004, 12 pages.
(Continued)

*Primary Examiner* — Hsiungfei Peng
(74) *Attorney, Agent, or Firm* — Conley Rose, P.C.

(57) ABSTRACT

A video transmission method, system and a device includes a sending device that generates and sends a source video stream, where the source video stream includes a plurality of video data packets, each video data packet includes discard indication information, a discard priority indicated by discard indication information included in a first video data packet is higher than a discard priority indicated by discard indication information included in a second video data packet, video data in a video frame whose frame type is a non-reference B frame is encapsulated into the first video data packet, and video data in a video frame whose frame type is an I frame, a P frame, or a reference B frame is encapsulated into the second video data packet.

20 Claims, 25 Drawing Sheets

(51) Int. Cl.
  *H04N 21/24*      (2011.01)
  *H04N 21/61*      (2011.01)
  *H04N 21/647*     (2011.01)
  *H04N 21/434*     (2011.01)
  *H04N 21/4402*    (2011.01)
  *H04N 21/2343*    (2011.01)
  *H04L 47/32*      (2022.01)
  *H04N 21/643*     (2011.01)

(52) U.S. Cl.
  CPC ....... *H04N 21/434* (2013.01); *H04N 21/4402* (2013.01); *H04N 21/643* (2013.01)

(56) References Cited

U.S. PATENT DOCUMENTS

| | | | |
|---|---|---|---|
| 2007/0097205 | A1 | 5/2007 | Venkatachalam |
| 2008/0144505 | A1 | 6/2008 | Isnardi et al. |
| 2008/0186852 | A1* | 8/2008 | Sami .............. H04L 45/306 370/235 |
| 2009/0222855 | A1 | 9/2009 | Vare et al. |
| 2010/0138885 | A1 | 6/2010 | Haimi-Cohen |
| 2011/0199907 | A1 | 8/2011 | Zheng et al. |
| 2011/0274121 | A1 | 11/2011 | Xun et al. |
| 2012/0063462 | A1 | 3/2012 | Hu et al. |
| 2012/0151540 | A1 | 6/2012 | Stanwood et al. |
| 2015/0222932 | A1* | 8/2015 | Liao ................. H04N 19/895 375/240.27 |
| 2016/0142762 | A1 | 5/2016 | Tsukagoshi |
| 2016/0294910 | A1* | 10/2016 | Li ..................... H04N 21/2662 |
| 2016/0344643 | A1* | 11/2016 | Stanwood ........... H04N 21/2402 |
| 2017/0054697 | A1* | 2/2017 | Zhang ................. H04N 21/4405 |
| 2018/0241797 | A1* | 8/2018 | Bader ................ H04L 43/0829 |

FOREIGN PATENT DOCUMENTS

| | | | |
|---|---|---|---|
| CN | 101729228 | A | 6/2010 |
| CN | 101047476 | B | 8/2010 |
| CN | 101800671 | A | 8/2010 |
| CN | 102104468 | A | 6/2011 |
| CN | 101605243 | B | 8/2011 |
| CN | 101651826 | B | 8/2012 |
| CN | 101568027 | B | 9/2012 |
| CN | 101656888 | B | 1/2013 |
| CN | 102148674 | B | 8/2013 |
| CN | 103283249 | A | 9/2013 |
| CN | 102223218 | B | 6/2014 |
| CN | 104396238 | A | 3/2015 |
| CN | 101741752 | B | 8/2015 |
| CN | 105245469 | A | 1/2016 |
| CN | 105357592 | A | 2/2016 |
| CN | 105681931 | A | 6/2016 |
| CN | 105791260 | A | 7/2016 |
| CN | 105959731 | A | 9/2016 |
| EP | 1180870 | B1 | 12/2006 |
| EP | 2424241 | A1 | 2/2012 |
| JP | 2001078181 | A | 3/2001 |
| JP | 2008543142 | A | 11/2008 |
| JP | 2015050591 | A | 3/2015 |
| JP | 2015057875 | A | 3/2015 |

OTHER PUBLICATIONS

Machine Translation and Abstract of Chinese Publication No. CN101047476, Aug. 4, 2010, 13 pages.
Machine Translation and Abstract of Chinese Publication No. CN101098173, Jan. 2, 2008, 36 pages.
Machine Translation and Abstract of Chinese Publication No. CN101605243, Aug. 10, 2011, 18 pages.
Machine Translation and Abstract of Chinese Publication No. CN101656888, Jan. 16, 2013, 35 pages.
Machine Translation and Abstract of Chinese Publication No. CN101800671, Aug. 11, 2010, 13 pages.
Machine Translation and Abstract of Chinese Publication No. CN102104468, Jun. 22, 2011, 15 pages.
Machine Translation and Abstract of Chinese Publication No. CN102148674, Aug. 28, 2013, 14 pages.
Machine Translation and Abstract of Chinese Publication No. CN102223218, Jun. 25, 2014, 22 pages.
Machine Translation and Abstract of Chinese Publication No. CN105245469, Jan. 13, 2016, 17 pages.
Machine Translation and Abstract of Chinese Publication No. CN105357592, Feb. 24, 2016, 8 pages.
Machine Translation and Abstract of Chinese Publication No. CN105681931, Jun. 15, 2016, 16 pages.
Machine Translation and Abstract of Chinese Publication No. CN105791260, Jul. 20, 2016, 11 pages.
Machine Translation and Abstract of Chinese Publication No. CN105959731, Sep. 21, 2016, 6 pages.
Peng Yu et al., "Load Adaptive Dynamic Mapping for Video Streaming over IEEE 802.11 a Network," 2013, 6 pages.

* cited by examiner

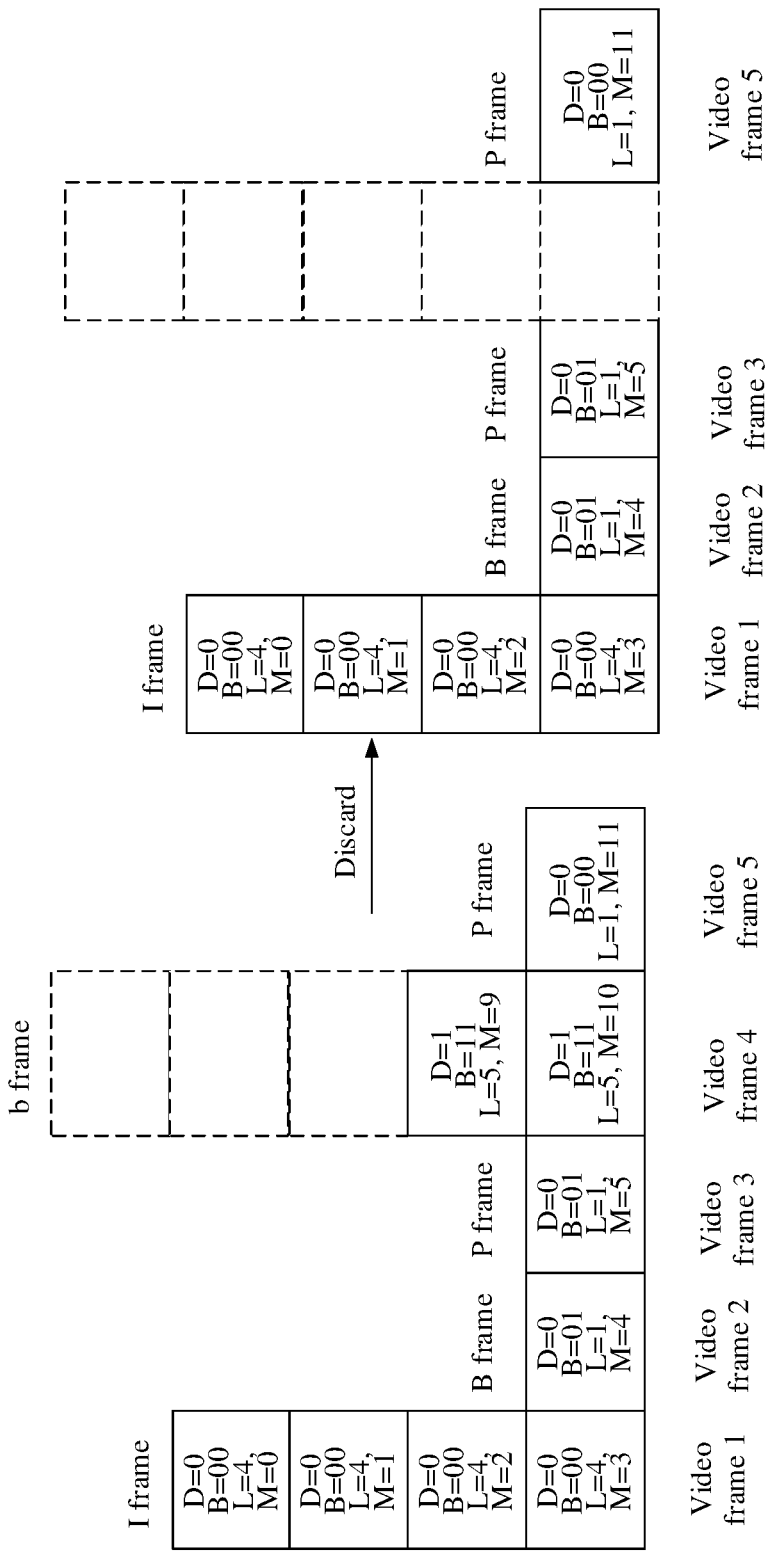

VIDEO TRANSMISSION METHOD AND SYSTEM AND DEVICE

CROSS-REFERENCE TO RELATED APPLICATIONS

This application is a continuation application of International Patent Application No. PCT/CN2018/084959, filed on Apr. 27, 2018, which claims priority to Chinese Patent Application No. 201710503244.5, filed on Jun. 27, 2017. The disclosures of the aforementioned applications are hereby incorporated by reference in their entireties.

TECHNICAL FIELD

Embodiments of the present disclosure relate to the field of multimedia technologies, and in particular, to a video transmission method and system and a device.

BACKGROUND

With development of multimedia transmission technologies, an Internet protocol television (IPTV) service and an over the top (OTT) service rapidly develop, and a video user scale rapidly increases. In addition, video technologies such as 4K, high dynamic range (HDR), and virtual reality (VR) appear, and a video bitrate greatly increases. The rapid increase in the user scale and the video bitrate is accompanied with huge video transmission traffic, and therefore congestion inevitably occurs in a transport network such as an OTT transport network.

In other approaches, to ease transport network congestion, when transmitting a video stream, a current network device determines a discard priority based on a video frame type, to selectively discard some data packets in the video stream. The video stream includes a series of group of pictures (GOP). One GOP may usually include one I frame and one or more video frames of another type (for example, a B frame and a P frame), and video data in each video frame may be encapsulated into a plurality of video data packets. Specifically, during transport network congestion, the current network device preferentially discards a video data packet in a B frame in the video stream, then discards a video data packet in a P frame, and finally discards a video data packet in an I frame.

A problem is that in a process of transmitting a video in a transport network, impact on user visual experience that is caused by loss of different video data packets greatly varies. In other words, after different data packets are discarded, user visual sensitivity greatly varies. After some video data packets are discarded, a video picture is little affected, and a user does not even feel a difference. However, after some data packets are lost, a video picture is greatly affected, and a phenomenon such as artifacts or frame freezing may occur, greatly affecting user experience. Specifically, during transport network congestion, a network device may discard a video data packet in any B frame in a video stream, and loss of the video data packet in the B frame may cause the phenomenon such as artifacts or frame freezing.

SUMMARY

This application provides a video transmission method and system and a device, to ease network congestion that occurs when a video stream is being transmitted in a transport network, and improve quality of an output video stream.

To achieve the foregoing objective, the following technical solutions are used in this application.

According to a first aspect, this application provides a video transmission method, where the method includes generating, by a sending device, a source video stream, where the source video stream includes a plurality of video data packets, each video data packet includes video frame information, the video frame information includes discard indication information, the discard indication information is used to indicate a discard priority of the video data packet, the plurality of video data packets include a first video data packet and a second video data packet, a discard priority indicated by discard indication information included in the first video data packet is higher than a discard priority indicated by discard indication information included in the second video data packet, video data in a video frame whose frame type is a non-reference B frame is encapsulated into the first video data packet, and video data in a video frame whose frame type is an I frame, a P frame, or a reference B frame is encapsulated into the second video data packet, and sending, by the sending device, the source video stream to a network device.

In the video transmission method provided in this application, because the discard priority indicated by the discard indication information included in the first video data packet is higher than the discard priority indicated by the discard indication information included in the second video data packet, in a transport network, the first video data packet may be discarded before the second video data packet such that the second video data packet is less likely to be discarded. Impact of the non-reference B frame (referred to as a b frame) on quality of the video stream is smaller than impact of the I frame, the P frame, or the reference B frame on the quality of the video stream. Therefore, the second video data packet is less likely to be discarded such that the quality of the video stream transmitted in the transport network is relatively high.

With reference to the first aspect, in a first possible implementation, video data in only one video frame is encapsulated into each video data packet, in other words, a boundary of a video frame is a boundary of a video data packet. Because one video data packet includes video data in only one video frame, in a process of transmitting the video stream in the transport network, even if one video data packet (for example, the first video data packet) is lost, quality of only a video frame corresponding to the video data packet is affected, and quality of a video frame other than the video frame is not affected such that quality of the video stream output to a receiving device is further improved.

With reference to the first aspect or the first possible implementation, in a second possible implementation, to indicate a video data packet that can be preferentially transmitted and a video data packet that may not be transmitted in one or more video data packets of the video stream, the video frame information may further include indication information indicating whether a video data packet can be preferentially transmitted. Specifically, the video frame information further includes priority indication information, and the priority indication information is used to indicate a transmission priority of the video data packet, namely, a level at which the video data packet is preferentially transmitted. Usually, in the transport network, a video data packet with a relatively high transmission priority indicated by priority indication information may be preferentially transmitted.

With reference to the second possible implementation, in a third possible implementation, to indicate a video frame to which a video data packet in the video stream belongs, for example, a video frame, in two adjacent b frames, to which a first video data packet belongs, the video frame information may further include indication information used to distinguish between different video frames and indicate a quantity of video data packets included in a video frame. Specifically, the video frame information further includes frame number indication information and frame length indication information, where the frame number indication information is used to indicate a number of a video frame in which the corresponding video data packet is located, and the frame length indication information is used to indicate a quantity of video data packets included in the video frame in which the corresponding video data packet is located. One or more video data packets in one video frame have same frame number indication information and same frame length indication information.

With reference to the third possible implementation, in a fourth possible implementation, the video data packet includes an application aware substrate protocol (A2SP) header, a Real-time Transport Protocol (RTP) header, and a video data part, the video data part is used to carry video data, an RTP data packet includes the RTP header and the video data part, an A2SP packet includes the RTP data packet and the A2SP header, and the A2SP header is used to carry the video frame information, where the RTP data packet is used as a payload of the A2SP packet, or the video data packet includes an RTP header, an RTP extension header, and a video data part, the video data part is used to carry video data, an RTP data packet includes the RTP header, the RTP extension header, and the video data part, and the RTP extension header is used to carry the video frame information.

In the transport network, video data in the video stream may be encapsulated into one or more video data packets using a medium access control (MAC) protocol of a physical layer, an Internet Protocol (IP) of a network layer, a user datagram protocol (UDP) of a transport layer, and an RTP protocol of an application layer. Therefore, in a process of obtaining the one or more video data packets through encapsulation, the sending device may enable an A2SP header or an RTP extension header in the video data packet to include the video frame information. In this way, in the process of transmitting, in the transport network, the video stream sent by the sending device, another device such as the network device or the receiving device in the transport network can receive the video data packet including the A2SP header or the RTP extension header, that is, receive the video data packet including the video frame information.

With reference to the fourth possible implementation, in a fifth possible implementation, the video data packet may further include a sequence number of the video data packet. The sequence number of the video data packet may be used to indicate a sequence of one or more video data packets. The sequence number of the video data packet may be included in an RTP header of an RTP data packet.

According to a second aspect, this application provides a video transmission method, where the method includes receiving, by a network device, a video stream, where the video stream includes a plurality of video data packets, each video data packet includes video frame information, the video frame information includes discard indication information, the discard indication information is used to indicate a discard priority of the video data packet, the plurality of video data packets include a first video data packet and a second video data packet, a discard priority indicated by discard indication information included in the first video data packet is higher than a discard priority indicated by discard indication information included in the second video data packet, video data in a video frame whose frame type is a non-reference B frame is encapsulated into the first video data packet, and video data in a video frame whose frame type is an I frame, a P frame, or a reference B frame is encapsulated into the second video data packet, and discarding, by the network device, one or more first video data packets based on the video frame information when determining that a network is congested.

In the video transmission method provided in this application, because the video frame information may include the discard indication information, the video stream received by the network device may include the video frame information. Therefore, the network device may distinguish between the first video data packet and the second video data packet in the video stream based on the video frame information, and discard one or more first video data packets in the video stream. In this way, the network device can preferentially discard the first video data packet in the video stream, to ease network congestion. In addition, the network device may discard only one or more first video data packets without discarding the second video data packet such that quality of the video stream transmitted to a receiving device can be improved. Further, a possibility that a phenomenon such as artifacts or frame freezing occurs when the video stream is played on a device such as a television can be reduced.

With reference to the second aspect, in a first possible implementation, video data in only one video frame is encapsulated into each video data packet, in other words, a boundary of a video frame is a boundary of a video data packet. For detailed descriptions of the implementation, refer to the descriptions in the first possible implementation of the first aspect. Details are not described again in this application.

With reference to the first possible implementation, in a second possible implementation, the discarding, by the network device, one or more first video data packets based on the video frame information when determining that a network is congested may include obtaining, by the network device when determining that the network is congested, a color of the video data packet through mapping based on the discard indication information included in the video frame information, where the color is used to indicate a discard level of the video data packet, and discarding, by the network device, the one or more first video data packets based on the color, to obtain an intermediate video stream.

It should be noted that in the video transmission method provided in this embodiment of the present disclosure, because the video frame information added by a sending device to the video data packet includes the discard indication information, the network device may obtain an internal label (for example, the color) of the video data packet based on the video frame information in the video data packet. Therefore, the network device may add internal labels to video data packets, to distinguish between internal transmission priorities of the video data packets on a network device side. In this way, the network device can distinguish the first video data packet based on the internal transmission priorities, and discard one or more first video data packets, to ease network congestion and improve quality of the output video stream.

With reference to the first possible implementation, in a third possible implementation, the video frame information may further include priority indication information, and the priority indication information is used to indicate a transmission priority of the video data packet. The discarding, by the network device, one or more first video data packets based on the video frame information when determining that a network is congested may include discarding, by the network device when determining that the network is congested, the one or more first video data packets based on the discard indication information and the priority indication information that are included in the video frame information.

The priority indication information included in the video data packet may be determined based on a service priority or a user priority of a video stream in which the video data packet is located. Specifically, the network device may add, based on the priority indication information included in the video frame information, an internal label to each video data packet entering a current queue, to distinguish an internal transmission priority of the video data packet on a network device side. Usually, an internal transmission priority of the first video data packet is the lowest. The network device may preferentially discard the first video data packet when the network is congested. In this way, the second video data packet may not be lost in the video stream, and quality of the video stream output in the transport network is relatively high.

With reference to the third possible implementation, in a fourth possible implementation, the discarding, by the network device when determining that the network is congested, the one or more first video data packets based on the discard indication information and the priority indication information that are included in the video frame information may include obtaining, by the network device, a service level and a color of the video data packet through mapping based on the discard indication information and the priority indication information that are included in the video frame information, where the service level is used to indicate a level of a queue through which the network device transmits the video data packet, and the color is used to indicate a discard level of the video data packet, and discarding, by the network device, the one or more first video data packets based on the service level and the color when determining, based on the service level of the video data packet, that the network is congested, to obtain an intermediate video stream.

It should be noted that in the video transmission method provided in this application, because the video frame information of the video data packet includes the discard indication information and the priority indication information, the network device may obtain an internal label (for example, the color and the service level) of the video data packet based on the video frame information included in the video data packet. Therefore, the network device may add internal labels to video data packets, to obtain internal transmission priorities of the video data packets on the network device side. Then the network device may distinguish the first video data packet from the second video data packet based on the internal transmission priorities. In this way, the network device can preferentially discard one or more first video data packets more accurately, to ease network congestion and further improve quality of the output video stream.

With reference to the third possible implementation, in a fifth possible implementation, the video frame information may further include frame number indication information, and the frame number indication information is used to indicate a number of a video frame in which the corresponding video data packet is located. The discarding, by the network device when determining that the network is congested, the one or more first video data packets based on the discard indication information and the priority indication information that are included in the video frame information may include discarding, by the network device when determining that the network is congested, the one or more first video data packets based on the discard indication information, the priority indication information, and the frame number indication information that are included in the video frame information. The frame number indication information included in the video frame information may indicate a video frame to which a video data packet in the video stream belongs, for example, a video frame, in two adjacent b frames, to which a first video data packet belongs. Frame number indication information of a plurality of video data packets in one video frame is the same. Therefore, in a process of discarding one or more first video data packets, the network device may selectively discard some first video data packets in one b frame.

With reference to the fifth possible implementation, in a sixth possible implementation, the discarding, by the network device, one or more first video data packets based on the video frame information when determining that a network is congested includes obtaining, by the network device, a service level of the video data packet through mapping based on the priority indication information included in the video frame information, where the service level is used to indicate a level of a queue through which the network device transmits the video data packet, detecting, by the network device, a length of the queue based on the service level of the video data packet, and discarding, by the network device, the one or more first video data packets based on the length of the queue and the frame number indication information and the discard indication information that are included in the video frame information, to obtain an intermediate video stream.

In the video transmission method provided in this application, a plurality of video data packets may be divided into different parts based on the frame number indication information included in the video frame information. In addition, when distinguishing the first video data packet, the network device may further distinguish between different parts in one or more first video data packets, and discard some specified video data packets in the one or more first video data packets based on a network congestion degree. In this way, in a process of discarding a first video data packet by the network device, a quantity of affected video streams can be reduced, and quality of the video stream transmitted to the receiving device is further improved.

With reference to any one of the second aspect or the foregoing possible implementations, in a seventh possible implementation, the video frame information may further include frame length indication information, the frame length indication information is used to indicate a quantity of video data packets included in the video frame in which the video data packet is located, and the video data packet further includes a sequence number of the video data packet, and after the discarding, by the network device, one or more first video data packets based on the video frame information when determining that a network is congested, the method further includes, when the network device is adjacent to the receiving device, discarding, by the network device, a third video data packet based on the sequence number of the video data packet in the intermediate video stream and the discard indication information, the frame number indication information, and the frame length indication information that are included in the video frame information, to obtain a to-be-decoded video stream, where the third video data packet is a packet into which video data in an incomplete video frame whose frame type is the non-reference B frame is encapsulated, and all video frames in the to-be-decoded video stream are complete video frames, and sending, by the network device, the to-be-decoded video stream to the receiving device.

It should be noted that the sequence number of the video data packet may be used to indicate a sequence of one or more video data packets. The network device performs the step of "discarding one or more first video data packets" when the network is congested, and when the network device stops performing the step of "discarding one or more first video data packets", some video frames may be incomplete. A video frame in which some video data packets are discarded and the other video data packets are not discarded is an incomplete video frame. The network device may find, based on the frame length indication information and the sequence number of the video data packet, the video data packets that are not discarded in the incomplete video frame. In this case, the network device adjacent to the receiving device may further discard a video data packet that is not discarded in the incomplete video frame, namely, a first video data packet that is not discarded, to obtain a to-be-decoded video stream. In this way, quality of the video stream transmitted to the receiving device can be relatively high such that a possibility that a phenomenon such as artifacts or frame freezing occurs when the video stream is played on a device such as a television is further reduced.

With reference to any one of the second aspect or the foregoing possible implementations, the video data packet includes an A2SP header, an RTP header, and a video data part, the video data part is used to carry video data, an RTP data packet includes the RTP header and the video data part, an A2SP packet includes the RTP data packet and the A2SP header, and the A2SP header is used to carry the video frame information, where the RTP data packet is used as a payload of the A2SP packet, or the video data packet includes an RTP header, an RTP extension header, and a video data part, the video data part is used to carry video data, an RTP data packet includes the RTP header, the RTP extension header, and the video data part, and the RTP extension header is used to carry the video frame information. The video data packet includes the A2SP header or the RTP extension header, and the A2SP header or the RTP extension header includes the video frame information. Therefore, in a process of transmitting the video stream in the transport network, the network device, the receiving device, or the like in the transport network may receive a video data packet including an A2SP header or an RTP extension header, to obtain video frame information in the video data packet.

According to a third aspect, this application provides a video transmission method, where the method includes receiving, by a receiving device, an intermediate video stream sent by a network device, where the intermediate video stream includes a plurality of video data packets, each video data packet includes video frame information, and the video frame information includes discard indication information, where the video frame information includes the discard indication information, frame number indication information, and frame length indication information, the discard indication information is used to indicate a discard priority of the video data packet, the frame number indication information is used to indicate a number of a video frame in which the video data packet is located, the frame length indication information is used to indicate a quantity of video data packets included in the video frame in which the video data packet is located, the plurality of video data packets include a first video data packet and/or a second video data packet, a discard priority indicated by discard indication information included in the first video data packet is higher than a discard priority indicated by discard indication information included in the second video data packet, video data in a video frame whose frame type is a non-reference B frame is encapsulated into the first video data packet, video data in a video frame whose frame type is an I frame, a P frame, or a reference B frame is encapsulated into the second video data packet, and the video data packet further includes a sequence number of the video data packet, discarding, by the receiving device, a third video data packet based on the sequence number of the video data packet in the intermediate video stream and the discard indication information, the frame number indication information, and the frame length indication information that are included in the video frame information, to obtain a to-be-decoded video stream, where the third video data packet is a packet into which video data in an incomplete video frame whose frame type is the non-reference B frame is encapsulated, and all video frames in the to-be-decoded video stream are complete video frames, and decoding, by the receiving device, the to-be-decoded video stream.

The network device performs the step of "discarding one or more first video data packets" when a network is congested, and when the network device stops performing the step of "discarding one or more first video data packets", some video frames may be incomplete. In this case, after receiving the intermediate video stream sent by the network device, the receiving device may discard a video data packet that is not discarded in the incomplete video frame, namely, a first video data packet that is not discarded, to obtain a to-be-decoded video stream including a complete video frame. In this way, quality of a video stream obtained by the receiving device through decoding can be relatively high such that a possibility that a phenomenon such as artifacts or frame freezing occurs when the video stream is played on a device such as a television is further reduced.

According to a fourth aspect, this application provides a sending device, where the sending device includes a generation module and a sending module. The generation module is configured to generate a source video stream, where the source video stream includes a plurality of video data packets, each video data packet includes video frame information, the video frame information includes discard indication information, the discard indication information is used to indicate a discard priority of the video data packet, the plurality of video data packets include a first video data packet and a second video data packet, a discard priority indicated by discard indication information included in the first video data packet is higher than a discard priority indicated by discard indication information included in the second video data packet, video data in a video frame whose frame type is a non-reference B frame is encapsulated into the first video data packet, and video data in a video frame whose frame type is an I frame, a P frame, or a reference B frame is encapsulated into the second video data packet. The sending module is configured to send the source video stream generated by the generation module to a network device.

With reference to the fourth aspect, in a first possible implementation, video data in only one video frame is encapsulated into each video data packet.

With reference to the fourth aspect or the first possible implementation, in a second possible implementation, the video frame information further includes priority indication information, and the priority indication information is used to indicate a transmission priority of the video data packet.

With reference to any one of the first aspect or the foregoing implementations, in a third possible implementation, the video frame information may further include frame number indication information and frame length indication information, where the frame number indication information is used to indicate a number of a video frame in which the corresponding video data packet is located, and the frame length indication information is used to indicate a quantity of video data packets included in the video frame in which the corresponding video data packet is located.

With reference to any one of the first aspect or the foregoing implementations, in a fourth possible implementation, the video data packet includes an A2SP header, an RTP header, and a video data part, the video data part is used to carry video data, an RTP data packet includes the RTP header and the video data part, an A2SP packet includes the RTP data packet and the A2SP header, and the A2SP header is used to carry the video frame information, where the RTP data packet is used as a payload of the A2SP packet, or the video data packet includes an RTP header, an RTP extension header, and a video data part, the video data part is used to carry video data, an RTP data packet includes the RTP header, the RTP extension header, and the video data part, and the RTP extension header is used to carry the video frame information.

With reference to the fourth possible implementation, in a fifth possible implementation, the video data packet may further include a sequence number of the video data packet.

According to a fifth aspect, this application provides a network device, where the network device includes a receiving module and a congestion processing module. The receiving module is configured to receive a video stream, where the video stream includes a plurality of video data packets, each video data packet includes video frame information, the video frame information includes discard indication information, the discard indication information is used to indicate a discard priority of the video data packet, the plurality of video data packets include a first video data packet and a second video data packet, a discard priority indicated by discard indication information included in the first video data packet is higher than a discard priority indicated by discard indication information included in the second video data packet, video data in a video frame whose frame type is a non-reference B frame is encapsulated into the first video data packet, and video data in a video frame whose frame type is an I frame, a P frame, or a reference B frame is encapsulated into the second video data packet. The congestion processing module is configured to, when a network is congested, discard one or more first video data packets based on the video frame information obtained by the receiving module.

With reference to the fifth aspect, in a first possible implementation, video data in only one video frame is encapsulated into each video data packet.

With reference to the first possible implementation, in a second possible implementation, the video frame information further includes priority indication information, and the priority indication information is used to indicate a priority of the video data packet, and the network congestion module is further configured to, when the network is congested, discard the one or more first video data packets based on the discard indication information and the priority indication information that are included in the video frame information.

With reference to the second possible implementation, in a third possible implementation, the congestion processing module may include a first mapping submodule and a first congestion processing submodule. The first mapping submodule is configured to obtain a service level and a color of the video data packet through mapping based on the discard indication information and the priority indication information that are included in the video frame information, where the service level is used to indicate a level of a queue through which the network device transmits the video data packet, and the color is used to indicate a discard level of the video data packet. The first congestion processing submodule is configured to discard the one or more first video data packets based on the service level that is of the video data packet and that is obtained by the first mapping submodule through mapping and the color when it is determined, based on the service level, that the network is congested, to obtain an intermediate video stream.

With reference to the third possible implementation, in a fourth possible implementation, the video frame information may further include frame number indication information, and the frame number indication information is used to indicate a number of a video frame in which the video data packet is located, and the congestion processing module is further configured to, when the network is congested, discard the one or more first video data packets based on the discard indication information, the priority indication information, and the frame number indication information that are included in the video frame information.

With reference to the fourth possible implementation, in a fifth possible implementation, the congestion processing module may include a second mapping submodule and a second congestion processing submodule. The second mapping submodule is configured to obtain a service level of the video data packet through mapping based on the priority indication information included in the video frame information, where the service level is used to indicate a level of a queue through which the network device transmits the video data packet. The second congestion processing submodule is configured to detect a length of the queue based on the service level that is of the video data packet and that is obtained by the second mapping submodule through mapping, and discard the one or more first video data packets based on the length of the queue and the frame number indication information and the discard indication information that are included in the video frame information, to obtain an intermediate video stream.

With reference to any one of the fifth aspect or the foregoing possible implementations, in a sixth possible implementation, the video frame information further includes frame length indication information, the frame length indication information is used to indicate a quantity of video data packets included in the video frame in which the video data packet is located, and the video data packet further includes a sequence number of the video data packet, and the network device may further include a packet discard processing module. The packet discard processing module is configured to, when the network device is adjacent to a receiving device, discard a third video data packet based on the sequence number of the video data packet in the intermediate video stream and the discard indication information, the frame number indication information, and the frame length indication information that are included in the video frame information, to obtain a to-be-decoded video stream, where the third video data packet is a packet into which video data in an incomplete video frame whose frame type is the non-reference B frame is encapsulated, and all video frames in the to-be-decoded video stream are complete video frames. The sending module is configured to, when the network device is adjacent to the receiving device, send the to-be-decoded video stream obtained by the packet discard processing module to the receiving module.

With reference to a seventh possible implementation, in an eighth possible implementation, the video data packet includes an A2SP header, an RTP header, and a video data part, the video data part is used to carry video data, an RTP data packet includes the RTP header and the video data part, an A2SP packet includes the RTP data packet and the A2SP header, and the A2SP header is used to carry the video frame information, where the RTP data packet is used as a payload of the A2SP packet, or the video data packet includes an RTP header, an RTP extension header, and a video data part, the video data part is used to carry video data, an RTP data packet includes the RTP header, the RTP extension header, and the video data part, and the RTP extension header is used to carry the video frame information.

With reference to the first possible implementation, in a ninth possible implementation, the congestion processing module may include a third mapping submodule and a third congestion processing submodule. The third mapping submodule is configured to, when the network is congested, obtain a color of the video data packet through mapping based on the discard indication information included in the video frame information, where the color is used to indicate a discard level of the video data packet. The third congestion processing submodule is configured to discard the one or more first video data packets based on the color obtained by the third mapping submodule, to obtain an intermediate video stream.

According to a sixth aspect, this application provides a receiving device, where the receiving device includes a receiving module, a packet discard processing module, and a decoding module. The receiving module is configured to receive an intermediate video stream sent by a network device, where the intermediate video stream includes a plurality of video data packets, each video data packet includes video frame information, and the video frame information includes discard indication information, where the video frame information includes the discard indication information, frame number indication information, and frame length indication information, the discard indication information is used to indicate a discard priority of the video data packet, the frame number indication information is used to indicate a number of a video frame in which the video data packet is located, the frame length indication information is used to indicate a quantity of video data packets included in the video frame in which the video data packet is located, the plurality of video data packets include a first video data packet and a second video data packet, a discard priority indicated by discard indication information included in the first video data packet is higher than a discard priority indicated by discard indication information included in the second video data packet, video data in a video frame whose frame type is a non-reference B frame is encapsulated into the first video data packet, video data in a video frame whose frame type is an I frame, a P frame, or a reference B frame is encapsulated into the second video data packet, and the video data packet further includes a sequence number of the video data packet. The packet discard processing module is configured to discard a third video data packet based on the sequence number of the video data packet in the intermediate video stream obtained by the receiving module and the discard indication information, the frame number indication information, and the frame length indication information that are included in the video frame information, to obtain a to-be-decoded video stream, where the third video data packet is a packet into which video data in an incomplete video frame whose frame type is the non-reference B frame is encapsulated, and all video frames in the to-be-decoded video stream are complete video frames. The decoding module is configured to decode the to-be-decoded video stream obtained by the packet discard processing module.

According to a seventh aspect, this application provides a video transmission system, where the system may include the sending device according to any one of the fourth aspect or the possible implementations of the fourth aspect, at least one network device according to any one of the fifth aspect or the possible implementations of the fifth aspect, and the receiving device according to any one of the sixth aspect or the possible implementations of the sixth aspect.

According to an eighth aspect, this application provides a sending device, where the sending device includes at least one processor, a memory, a communications interface, and a communications bus, where the memory is configured to store at least one instruction, the at least one processor, the memory, and the communications interface are connected using the communications bus, and when a computer runs, the at least one processor executes the at least one instruction stored in the memory such that the computer performs the video transmission method according to any one of the first aspect or the possible implementations of the first aspect.

According to a ninth aspect, this application further provides a computer storage medium, where the computer storage medium stores a computer instruction, and when the computer instruction runs on a terminal, the sending device performs the video transmission method according to any one of the first aspect or the possible implementations of the first aspect in this application.

According to a tenth aspect, this application further provides a computer program product, where when the computer program product runs on a computer, the computer performs the video transmission method according to any one of the first aspect or the possible implementations of the first aspect in this application.

It may be understood that the sending device in the eighth aspect, the computer storage medium in the ninth aspect, and the computer program product in the tenth aspect that are provided above are all configured to perform the corresponding methods provided above. Therefore, for beneficial effects that can be achieved by the sending device, the computer storage medium, and the computer program product, reference may be made to beneficial effects in the corresponding methods provided above. Details are not described herein again.

According to an eleventh aspect, this application provides a network device, where the network device includes at least one processor, a memory, a communications interface, and a communications bus, where the memory is configured to store at least one instruction, the at least one processor, the memory, and the communications interface are connected using the communications bus, and when a computer runs, the at least one processor executes the at least one instruction stored in the memory such that the computer performs the video transmission method according to any one of the second aspect or the possible implementations of the second aspect.

According to a twelfth aspect, this application further provides a computer storage medium, where the computer storage medium stores a computer instruction, and when the computer instruction runs on a terminal, the network device performs the video transmission method according to any one of the second aspect or the possible implementations of the second aspect in this application.

According to a thirteenth aspect, this application further provides a computer program product, where when the computer program product runs on a computer, the computer performs the video transmission method according to any one of the second aspect or the possible implementations of the second aspect in this application.

It may be understood that the network device in the eleventh aspect, the computer storage medium in the twelfth aspect, and the computer program product in the thirteenth aspect that are provided above are all configured to perform the corresponding methods provided above. Therefore, for beneficial effects that can be achieved by the network device, the computer storage medium, and the computer program product, reference may be made to beneficial effects in the corresponding methods provided above. Details are not described herein again.

According to a fourteenth aspect, this application provides a receiving device, where the receiving device includes at least one processor, a memory, a communications interface, and a communications bus, where the memory is configured to store at least one instruction, the at least one processor, the memory, and the communications interface are connected using the communications bus, and when a computer runs, the at least one processor executes the at least one instruction stored in the memory such that the computer performs the video transmission method according to any one of the third aspect or the possible implementations of the third aspect.

According to a fifteenth aspect, this application further provides a computer storage medium, where the computer storage medium stores a computer instruction, and when the computer instruction runs on a terminal, the receiving device performs the video transmission method according to any one of the third aspect or the possible implementations of the third aspect in this application.

According to a sixteenth aspect, this application further provides a computer program product, where when the computer program product runs on a computer, the computer performs the video transmission method according to any one of the third aspect or the possible implementations of the third aspect in this application.

It may be understood that the receiving device in the fourteenth aspect, the computer storage medium in the fifteenth aspect, and the computer program product in the sixteenth aspect that are provided above are all configured to perform the corresponding methods provided above. Therefore, for beneficial effects that can be achieved by the receiving device, the computer storage medium, and the computer program product, reference may be made to beneficial effects in the corresponding methods provided above. Details are not described herein again.

According to a seventeenth aspect, this application provides a video transmission system, where the system may include the sending device according to the eighth aspect, at least one network device according to the eleventh aspect, and the receiving device according to the fourteenth aspect.

BRIEF DESCRIPTION OF THE DRAWINGS

FIG. 21A is a schematic diagram 2 of a video stream according to an embodiment of the present disclosure.

FIG. 21B is a continuation of the schematic diagram 2 of a video stream according to an embodiment of the present disclosure.

DESCRIPTION OF EMBODIMENTS

Embodiments of the present disclosure provide a video transmission method and system and a device, applied to a process of transmitting a video stream in a transport network, to further ease network congestion that occurs when a video stream is being transmitted in the transport network, thereby improving quality of an output video stream.

The following describes in detail the technical solutions in the embodiments of the present disclosure with reference to the accompanying drawings in the embodiments of the present disclosure.

Figure 1:
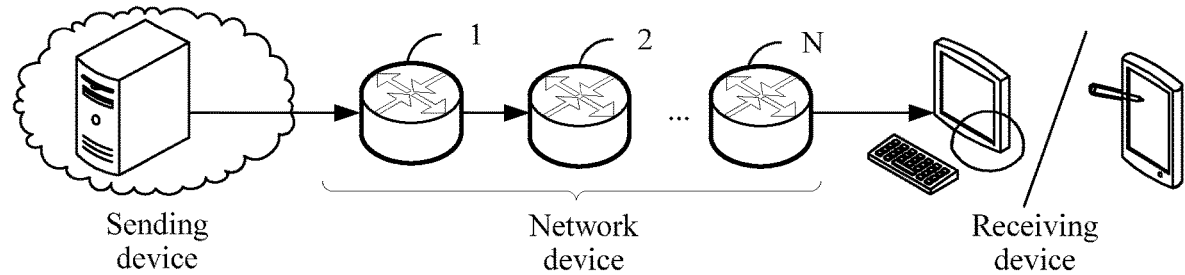
FIG. 1 is a schematic structural diagram 1 of a transport network according to an embodiment of the present disclosure.

For example, FIG. 1 is a schematic structural diagram of a transport network according to an embodiment of the present disclosure. In FIG. 1, the transport network may include a sending device, a receiving device, and one or more network devices. The one or more network devices in FIG. 1 are a network device 1, a network device 2, a network device N, and the like, and a value of N is a positive integer greater than or equal to 1.

The sending device is configured to provide a video source. In addition, the sending device may further send a source video stream to a network device adjacent to the sending device. The network device is configured to transmit the video stream to the receiving device. The receiving device is configured to receive the video stream. "Network congestion" in this embodiment of the present disclosure may be specifically network congestion that occurs in a process of transmitting a video stream by one or more network devices in the transport network.

It should be noted that in this embodiment of the present disclosure, the video stream may be transmitted from upstream (namely, a direction toward the sending device) to downstream (namely, a direction toward the receiving device). In addition, the network device in the one or more network devices that is adjacent to the sending device, namely, a network device closest to the sending device, may be referred to as a most upstream device, and a network device in the one or more network devices that is adjacent to the receiving device, namely, a network device closest to the receiving device, is referred to as a most downstream device.

Figure 2:
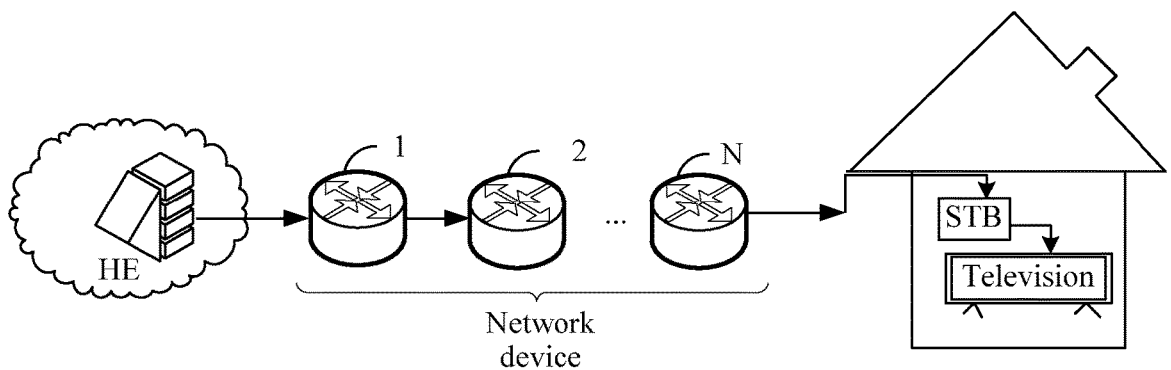
FIG. 2 is a schematic structural diagram 2 of a transport network according to an embodiment of the present disclosure.

Specifically, the transport network in this embodiment of the present disclosure may be an IPTV transport network, an OTT transport network, or the like. For example, the transport network in this embodiment of the present disclosure is an IPTV transport network. As shown in FIG. 2, in the IPTV transport network, a sending device may be a head end (HE) device provided by an operator, and a receiving device may be a terminal device provided by the operator. The HE provides an IPTV video source, encodes the video source into a video stream, then encapsulates video data in the video stream into a plurality of video data packets, and transmits the plurality of video data packets to the terminal device using one or more network devices. Then the terminal device transmits the plurality of video data packets to a display device for display. For example, the one or more network devices may be a network device 1, a network device 2, a network device N, and the like shown in FIG. 2, the terminal device may be a set top box (STB) shown in FIG. 2, and the display device may be a television shown in FIG. 2. In a transmission process, network congestion may occur due to impact of a network status. Therefore, to ensure that the video stream is transmitted from the HE device to the terminal device, some video data packets in the video stream may be usually discarded, that is, packet discarding occurs.

Specifically, the network device provided in this embodiment of the present disclosure may be a router such as a broadband remote access server (BARS). One network device is adjacent to the HE, for example, the network device 1 shown in FIG. 2 is adjacent to the HE. A video stream sent by the HE to the network device may be referred to as a source video stream. When the video stream is transmitted between the one or more network devices, the video stream may be referred to as an intermediate video stream. For example, a video stream transmitted by the network device 1 to the network device 2 may be referred to as an intermediate video stream. In addition, one network device is adjacent to the terminal device, for example, the network device N shown in FIG. 2 is adjacent to the HE. A video stream sent by the network device to the terminal device may be referred to as an intermediate video stream or a to-be-decoded video stream. The to-be-decoded video stream is a video stream that can be directly decoded by the terminal device.

Certainly, the sending device provided in this embodiment of the present disclosure may be the foregoing HE device, or may be another sending device that provides a video source and generates a source video stream. This is not specifically limited in this embodiment of the present disclosure.

The receiving device provided in this embodiment of the present disclosure may be the foregoing STB, or may be another terminal device that can receive and decode a video stream, for example, a mobile phone, a tablet computer, a notebook computer, an ultra-mobile personal computer (UMPC), or a netbook. This is not specifically limited in this embodiment of the present disclosure.

Figure 3:
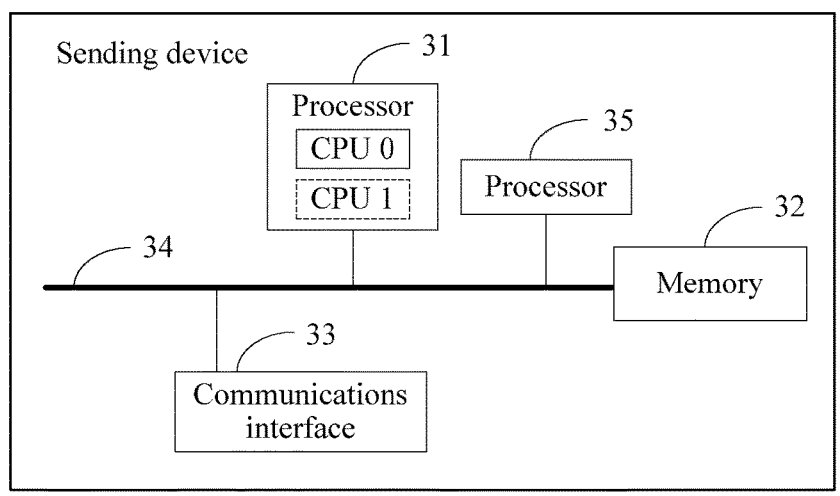
FIG. 3 is a schematic diagram 1 of composition of a sending device according to an embodiment of the present disclosure.

For example, FIG. 3 is a schematic diagram of composition of a sending device according to an embodiment of the present disclosure. As shown in FIG. 3, the sending device may include at least one processor 31, a memory 32, and a communications interface 33.

The following describes each component of the sending device in detail with reference to FIG. 3.

The processor 31 is a control center of the device, and may be one processor or may be a collective name of a plurality of processing elements. For example, the processor 31 may be a central processing unit (CPU) or an application-specific integrated circuit (ASIC), or may be one or more integrated circuits configured to implement this embodiment of the present disclosure, for example, one or more microprocessors (DSP) or one or more field programmable gate arrays (FPGA).

The processor 31 may run or execute a software program stored in the memory 32, and invoke data stored in the memory 32, to perform various functions of the device. For example, the processor 31 may be configured to obtain video frames in a video stream through division and encapsulate video data packets in the video frames, to obtain a source video stream.

In specific implementation, in an embodiment, the processor 31 may include one or more CPUs, for example, a CPU 0 and a CPU 1 shown in FIG. 3.

In specific implementation, in an embodiment, the sending device may include a plurality of processors, for example, the processor 31 and a processor 35 shown in FIG. 3. Each of these processors may be a single-core processor (single-CPU), or may be a multi-core processor (multi-CPU). The processor herein may be one or more devices, circuits, and/or processing cores for processing data (for example, a computer program instruction).

The memory 32 may be a read-only memory (ROM) or another type of static storage device capable of storing static information and instructions, or a random access memory (RAM) or another type of dynamic storage device capable of storing information and instructions, or may be an electrically erasable programmable read-only memory (EEPROM), a compact disc read-only memory (CD-ROM), or other compact disc storage or optical disc storage (including a compressed optical disc, a laser disc, an optical disc, a digital versatile disc, a BLU-RAY disc, or the like), a magnetic disk storage medium or another magnetic storage device, or any other medium capable of carrying or storing expected program code in a form of instructions or data structures and capable of being accessed by a computer. This is not limited. The memory 32 may exist independently, and is connected to the processor 31 using a communications bus 34. Alternatively, the memory 32 may be integrated with the processor 31.

The memory 32 is configured to store a software program for executing the solutions in the embodiments of the present disclosure, and execution of the software program is controlled by the processor 31.

The communications interface 33 may include two communications interfaces a sending interface configured to send data to an external device and a receiving interface configured to receive data from the external device. In other words, the sending device may receive and send data through two different communications interfaces respectively. For example, one communications interface of the sending device may send a source video stream to the network device 1 shown in FIG. 1, and the other communications interface may receive a source video stream receiving response returned by the network device 1. Certainly, the communications interface 33 may integrate a data receiving function and a data sending function into one communications interface, and the communications interface has the data receiving function and the data sending function.

A structure of the sending device shown in FIG. 3 does not constitute a limitation on the sending device. The sending device may include components more or fewer than those shown in the figure, or may include a combination of some components, or may include components differently disposed.

Figure 4:
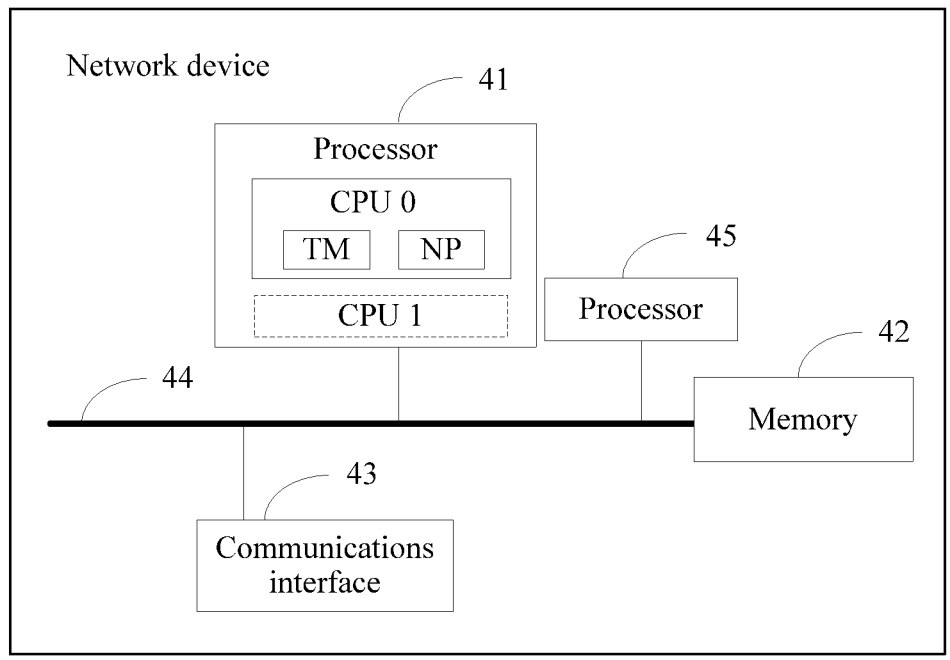
FIG. 4 is a schematic diagram 1 of composition of a network device according to an embodiment of the present disclosure.

For example, FIG. 4 is a schematic diagram of composition of a network device according to an embodiment of the present disclosure. As shown in FIG. 4, the network device may include at least one processor 41, a memory 42, and a communications interface 43.

The following describes each component of the network device in detail with reference to FIG. 4.

The processor 41 is a control center of the device, and may be one processor or may be a collective name of a plurality of processing elements. For example, the processor 41 is a CPU or an ASIC, or is one or more integrated circuits configured to implement this embodiment of the present disclosure, for example, one or more DSPs or one or more FPGAs. A network processor (NP) and a traffic manager (TM) that are used for network congestion management may be further integrated into the processor 41.

The processor 41 may run or execute a software program stored in the memory 42, and invoke data stored in the memory 42, to perform various functions of the device. For example, the processor 41 may be configured to determine whether a transport network is congested in a process of transmitting a video in the network, and selectively discard a video data packet transmitted to the network device.

In specific implementation, in an embodiment, the processor 41 may include one or more CPUs, for example, a CPU 0 and a CPU 1 shown in FIG. 4.

In specific implementation, in an embodiment, the network device may include a plurality of processors, for example, the processor 41 and a processor 45 shown in FIG. 4. Each of these processors may be a single-core processor, or may be a multi-core processor. The processor herein may be one or more devices, circuits, and/or processing cores for processing data (for example, a computer program instruction).

The memory 42 may be a ROM, a RAM, an EEPROM, a CD-ROM, or other compact disc storage or optical disc storage (including a compressed optical disc, a laser disc, an optical disc, a digital versatile disc, a BLU-RAY disc, or the like), a magnetic disk storage medium or another magnetic storage device, or any other medium capable of carrying or storing expected program code in a form of instructions or data structures and capable of being accessed by a computer. This is not limited. The memory 42 may exist independently, and is connected to the processor 41 using a communications bus 44. Alternatively, the memory 42 may be integrated with the processor 41.

The memory 42 is configured to store a software program for executing the solutions in the embodiments of the present disclosure, and execution of the software program is controlled by the processor 41.

The communications interface 43 may include two communications interfaces a sending interface configured to send data to an external device (for example, an upstream device or a downstream device adjacent to the network device 1 in FIG. 1) and a receiving interface configured to receive data from the external device. In other words, the device may receive and send data through two different communications interfaces respectively. For example, in FIG. 1, one communications interface of the network device 1 may be configured to receive a source video stream from the sending device, and the other communications interface may be configured to send an intermediate video stream to the network device 2. Certainly, the communications interface 43 may integrate a data receiving function and a data sending function into one communications interface, and the communications interface has the data receiving function and the data sending function.

A structure of the network device shown in FIG. 4 does not constitute a limitation on the network device. The network device may include components more or fewer than those shown in the figure, or may include a combination of some components, or may include components differently disposed.

Figure 5:
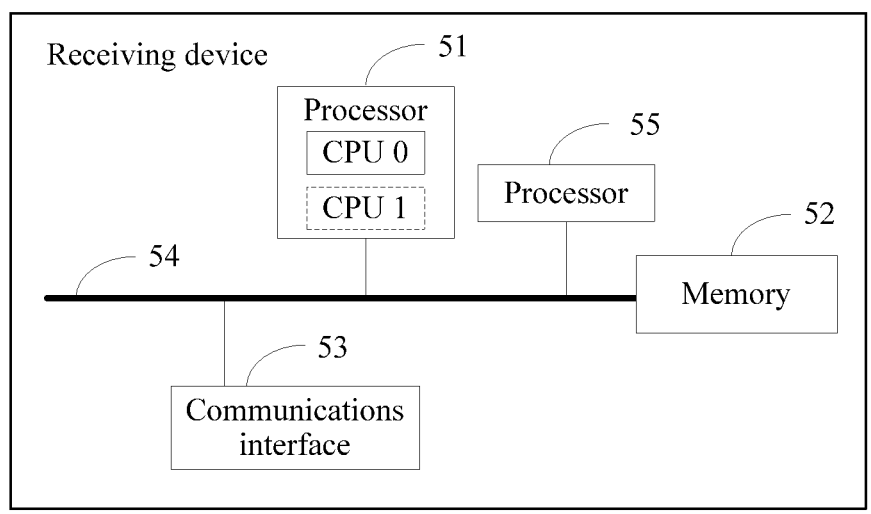
FIG. 5 is a schematic diagram 1 of composition of a receiving device according to an embodiment of the present disclosure.

For example, FIG. 5 is a schematic diagram of composition of a receiving device according to an embodiment of the present disclosure. As shown in FIG. 5, the receiving device may include at least one processor 51, a memory 52, and a communications interface 53.

The following describes each component of the network device in detail with reference to FIG. 5.

The processor 51 is a control center of the device, and may be one processor or may be a collective name of a plurality of processing elements. For example, the processor 51 is a CPU or an ASIC, or one or more integrated circuits configured to implement this embodiment of the present disclosure, for example, one or more DSPs or one or more FPGAs.

The processor 51 may run or execute a software program stored in the memory 52, and invoke data stored in the memory 52, to perform various functions of the network device. For example, the processor 51 may be configured to receive a to-be-decoded video stream from a network device, and decode the to-be-decoded video stream.

In specific implementation, in an embodiment, the processor 51 may include one or more CPUs, for example, a CPU 0 and a CPU 1 shown in FIG. 5.

In specific implementation, in an embodiment, the receiving device may include a plurality of processors, for example, the processor 51 and a processor 55 shown in FIG. 5. Each of these processors may be a single-core processor, or may be a multi-core processor. The processor herein may be one or more devices, circuits, and/or processing cores for processing data (for example, a computer program instruction).

The memory 52 may be a ROM, a RAM, an EEPROM, a CD-ROM, or other compact disc storage or optical disc storage (including a compressed optical disc, a laser disc, an optical disc, a digital versatile disc, a BLU-RAY disc, or the like), a magnetic disk storage medium or another magnetic storage device, or any other medium capable of carrying or storing expected program code in a form of instructions or data structures and capable of being accessed by a computer. This is not limited. The memory 52 may exist independently, and is connected to the processor 51 using a communications bus 54. Alternatively, the memory 52 may be integrated with the processor 51.

The memory 52 is configured to store a software program for executing the solutions in the embodiments of the present disclosure, and execution of the software program is controlled by the processor 51.

The communications interface 53 may include two communications interfaces a sending interface configured to send data to an external device (for example, an upstream device adjacent to the receiving device in FIG. 1) and a receiving interface configured to receive data from the external device. In other words, the device may receive and send data through two different communications interfaces respectively. For example, in FIG. 1, one communications interface of the receiving device may be configured to receive a video stream from the network device N, and the other communications interface may be configured to return a video stream receiving response to the network device N. Certainly, the communications interface 53 may integrate a data receiving function and a data sending function into one communications interface, and the communications interface has the data receiving function and the data sending function.

A structure of the receiving device shown in FIG. 5 does not constitute a limitation on the network device. The receiving device may include components more or fewer than those shown in the figure, or may include a combination of some components, or may include components differently disposed. For example, the receiving device may further include a display configured to play a video.

Figure 6:
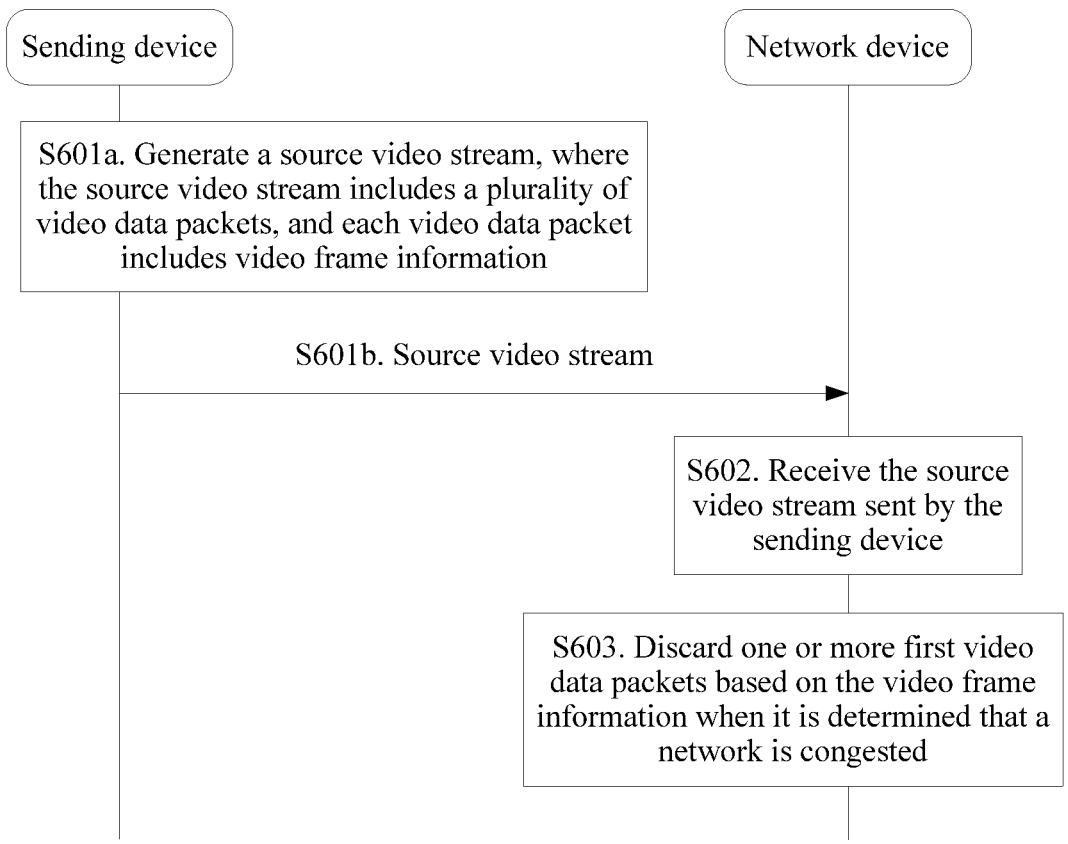
FIG. 6 is a flowchart 1 of a video transmission method according to an embodiment of the present disclosure.

To make the objectives, technical solutions, and advantages of the embodiments of the present disclosure clearer, with reference to the sending device shown in FIG. 3, one or more network devices shown in FIG. 4, and the receiving device shown in FIG. 5, the following describes in detail the video transmission method provided in the embodiments of the present disclosure using a flowchart of a video transmission method shown in FIG. 6. Referring to FIG. 6, the video transmission method provided in this embodiment of the present disclosure includes S601a and S601b.

S601a. A sending device generates a source video stream, where the source video stream includes a plurality of video data packets, and each video data packet includes video frame information.

S601b. The sending device sends the source video stream to a network device 1.

Step 601a may be performed by the processor 31 in the sending device shown in FIG. 3, and step 601b may be performed by the communications interface 33 in the sending device shown in FIG. 3.

The network device 1 in this embodiment of the present disclosure is a network device adjacent to the sending device.

In this embodiment of the present disclosure, the sending device may encode a video source into a video stream, frame types of video frames in the video stream may include an I frame, a P frame, a reference B frame, and a non-reference B frame, and the reference B frame and the non-reference B frame may be collectively referred to as a B frame. Each video frame includes video data.

Specifically, the I frame is a base frame (the first frame) of a GOP in the video stream, and one GOP usually includes only one I frame. Video data in the I frame is used to describe a background of an image and details of a moving body, and is generated without reference to another image. In addition, the I frame is a reference frame of the P frame, the reference B frame, and the non-reference B frame. Therefore, quality of the I frame directly affects quality of each video frame following the I frame in a corresponding GOP. For example, if some video data in the I frame is lost, another video frame following the I frame may be incorrectly encoded.

The P frame is a video frame following the I frame. The P frame uses only a closest I frame or a closest P frame preceding the P frame as a reference. The P frame may be a reference frame of a P frame following the P frame, or may be a reference frame of B frames preceding and following the P frame. Therefore, quality of the P frame also affects quality of a video frame following the P frame. For example, if some video data in the P frame is lost, another video frame following the P frame may be incorrectly encoded.

The B frame uses a video frame preceding the B frame and a video frame following the B frame as reference frames, and the B frame may include the reference B frame and the non-reference B frame (referred to as a b frame). The reference B frame may be used as a reference frame of some other B frames, and the b frame is not used as a reference frame of any video frame. Therefore, quality of the reference B frame may affect quality of a video frame following the reference B frame. For example, if some video data in the reference B frame is lost, another video frame following the reference B frame may be incorrectly encoded. However, quality of the b frame does not affect a video frame following the b frame. For example, if some video data in the b frame is lost, another video frame following the b frame is not incorrectly encoded. In other words, the b frame is a video frame that is not used as a reference of another video frame.

In conclusion, impact of a b frame, a reference B frame, a P frame, and an I frame in a video stream on quality of the video stream is in ascending order.

A frame type of the at least one video frame may include one or more of the I frame, the P frame, the reference B frame, and the non-reference B frame. Generally, a video stream may include video frames whose frame types are all of the I frame, the P frame, the reference B frame, and the b frame. Certainly, some video streams may not include a video frame whose frame type is the P frame.

It should be noted that the sending device may encapsulate video data in each video frame into a plurality of video data packets based on a specific data capacity. "Discarding some video data in a video stream" means that a network element such as a network device and/or a receiving device discards some video data packet in the video stream.

Generally, in a transport network, a MAC protocol of a physical layer, an IP of a network layer, a UDP of a transport layer, and a RTP of an application layer may be used to encapsulate video data in a video stream into a plurality of video data packets, to transmit the video stream.

For example, in an IPTV transport network, that the sending device encapsulates video data in a video stream into a plurality of video data packets may include encapsulating the video data into RTP as a payload of RTP such that an RTP packet includes the payload of RTP and an RTP header. The video data packet provided in this embodiment of the present disclosure may be an RTP packet.

To transmit the RTP packet at a physical layer, a network layer, and a transport layer, the sending device may further use the RTP packet as a payload of UDP such that a UDP packet includes the payload of UDP and a UDP header, use the UDP packet as a payload of IP such that an IP packet includes the payload of IP and an IP header, and use the IP packet as a payload of MAC such that a MAC packet includes the payload of MAC and a MAC header.

For example, it is assumed that three video frames included in a video stream are successively a video frame 1, a video frame 2, and a video frame 3, a size of video data in the video frame 1 is 400 kilobytes (KB), a size of video data in the video frame 2 is 350 KB, and a size of video data in the video frame 3 is 450 KB.

When the sending device presets a capacity of video data included in each video data packet to 80 KB, that is, a capacity of the video data part is 80 KB, the sending device may encapsulate the video frame 1 into video data packets 1 to 5, and the video data packets 1 to 5 each include video data of 80 KB, and the sending device may encapsulate the video frame 2 into video data packets 6 to 10, video data packets 6 to 9 each include video data of 80 KB, and the video data packet 10 includes video data of 30 KB.

It should be noted that when a size of video data in the last video data packet corresponding to one video frame does not reach a preset capacity (for example, 80 KB), the sending device may enable the last video data packet to include video data only in the video frame and exclude video data in another video frame following the video frame. In this way, video data in only one video frame is encapsulated into each video data packet, in other words, a boundary of a video frame is a boundary of a video data packet.

For example, the sending device may not encapsulate video data in the video frame 3 into the video data packet 10, but encapsulate the video data in the video frame 3 into video data packets 11 to 16. Video data packets 11 to 15 each include video data of 80 KB, and the video data packet 16 includes video data of 50 KB. In this way, a boundary of the video frame 1 is a boundary of the video data packet 5, a boundary of the video frame 2 is a boundary of the video data packet 10, and a boundary of the video frame 3 is a boundary of the video data packet 16.

It should be noted that in the video transmission method provided in this embodiment of the present disclosure, the sending device may add video frame information to each video data packet in a process of encapsulating video data in a video stream into a plurality video data packets.

A video data packet into which video data in a video frame whose frame type is the b frame is encapsulated may be denoted as a first video data packet, and a video data packet into which video data in a video frame whose frame type is a frame (namely, the I frame, the P frame, or the reference B frame) other than the b frame is encapsulated may be denoted as a second video data packet.

The video frame information includes discard indication information, and the discard indication information is used to indicate a discard priority of the video data packet. The discard indication information included in the video frame information may be further described as "discard indication information included in the video data packet" below. A discard priority indicated by discard indication information included in the first video data packet is higher than a discard priority indicated by discard indication information included in the second video data packet. In this case, a first video data packet and a second video data packet in a video stream such as the source video stream may be distinguished from each other based on the discard indication information. The discard indication information may be specifically a frame type of a video frame to which video data encapsulated into the video data packet belongs. Because based on the frame type, the b frame and a frame type other than the b frame can be distinguished from each other, the discard indication information may be used to indicate the discard priority of the video data packet. In this way, in a process of transmitting, in the transport network, the source video stream generated by the sending device, the network element such as the network device or the receiving device may receive the plurality of video data packets including the video frame information, that is, receive the video stream indicating the first video data packet. In this way, in the transport network, the first video data packet may be discarded before the second video data packet, and therefore the second video data packet is less likely to be discarded. Impact of the b frame on the video stream is smaller than impact of a video frame of a frame type other than the b frame on the video stream. Therefore, the second video data packet is less likely to be discarded such that quality of the video stream transmitted in the transport network is relatively high.

For example, the discard indication information (denoted as D) may be information of 1 bit. For example, a value of D in the first video data packet may be 1, and a value of D in the second video data packet may be 0.

Discard indication information carried in different video data packets obtained from a same video frame is the same. For example, if a frame type of the video frame 1 is the I frame, a value of D in each of the video data packets 1 to 5 is 0, and if a frame type of the video frame 3 is the b frame, a value of D in each of the video data packets 11 to 16 is 1.

It can be learned from the foregoing description that the sending device obtains the plurality of video data packets including the video frame information, to obtain the source video data stream. In the process of obtaining the source video stream, steps such as "encapsulating video data in each video frame into a plurality of video data packets" and "adding video frame information to each video data packet" may be specifically performed by the processor 31 shown in FIG. 3.

Further, in a possible implementation provided in this embodiment of the present disclosure, a method for adding video frame information to a video data packet by the sending device may include adding, by the sending device, the video frame information using an A2SP, where the A2SP protocol runs between the UDP protocol and the RTP protocol.

Figure 7:
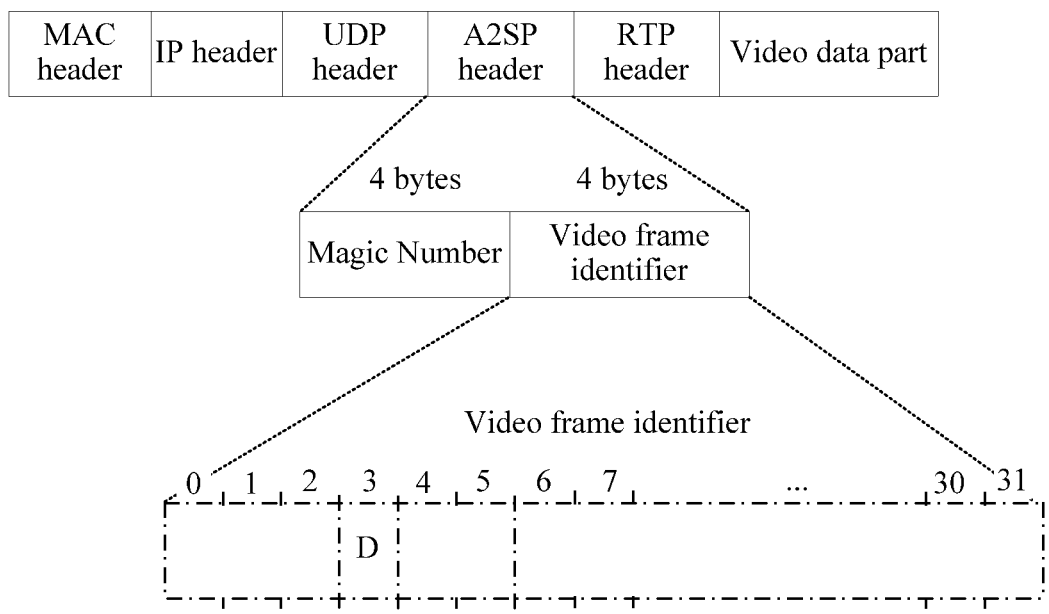
FIG. 7 is a schematic diagram 1 of composition of a video data packet according to an embodiment of the present disclosure.

For example, a video data packet shown in FIG. 7 includes an A2SP header. Specifically, video data is encapsulated into RTP as a payload of RTP, and an RTP packet includes the payload of RTP and an RTP header, the RTP packet is used as a payload of an A2SP packet, and the A2SP packet includes the payload of the A2SP packet and an A2SP header, the A2SP packet is used as a payload of UDP, and a UDP packet includes the payload of UDP and a UDP header, the UDP packet is used as a payload of IP, and an IP packet includes the payload of IP and an IP header, and the IP packet is used as a payload of MAC, and a MAC packet, namely, the foregoing video data packet, includes the payload of MAC and a MAC header. The A2SP header starts with Magic Number of 4 bytes, and Magic Number is used to indicate that the payload of UDP is an A2SP packet. Magic Number is followed by video frame information of 4 bytes (32 bits). Information of any bit in the 4 bytes in the video frame information may be used to indicate the discard indication information. In this case, the video data packet provided in this embodiment of the present disclosure may be an A2SP packet, and the A2SP packet includes an RTP packet and an A2SP header.

Optionally, in another possible implementation provided in this embodiment of the present disclosure, a method for adding video frame information to a video data packet by the sending device may include adding an RTP extension header after an RTP header using the RTP protocol, to add the video frame information.

Figure 8:
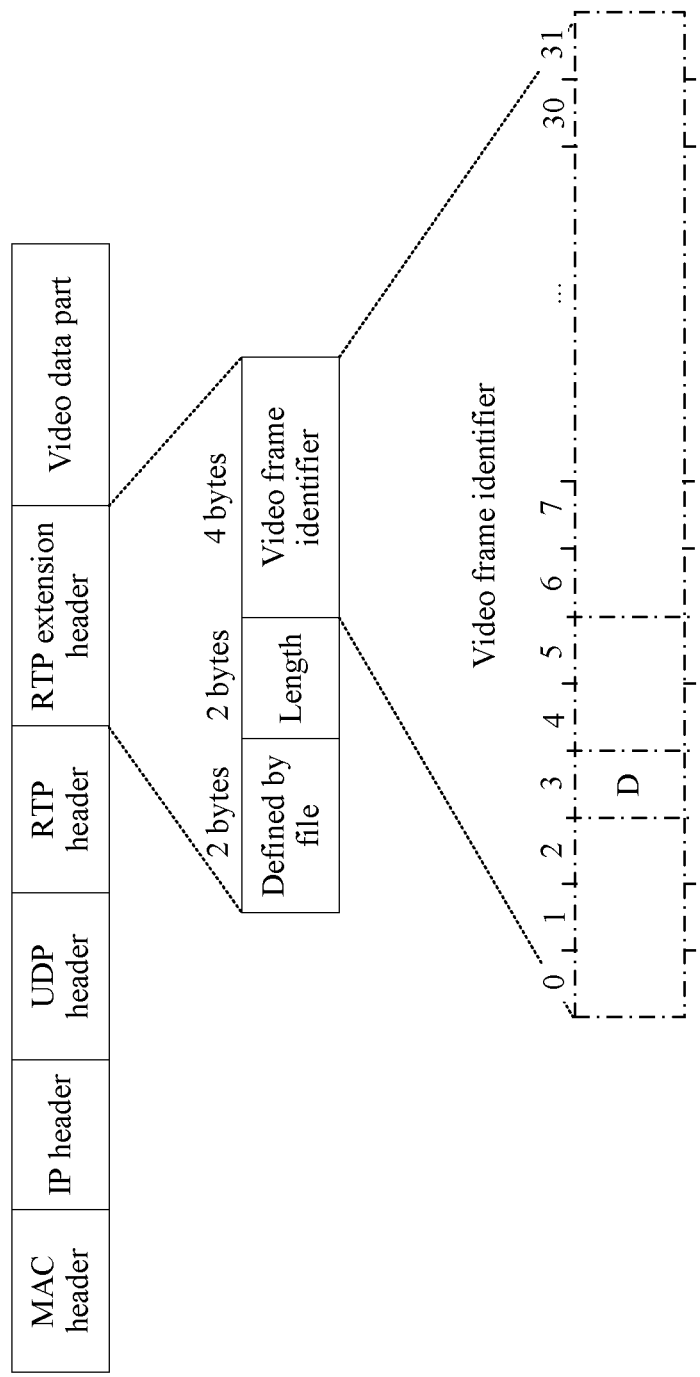
FIG. 8 is a schematic diagram 2 of composition of a video data packet according to an embodiment of the present disclosure.

For example, a video data packet shown in FIG. 8 includes an RTP extension header. Specifically, video data is encapsulated into RTP as a payload of RTP, and an RTP packet includes the payload of RTP, an RTP header, and an RTP extension header, the RTP packet is used as a payload of UDP, and a UDP packet includes the payload of UDP and a UDP header, the UDP packet is used as a payload of IP, and an IP packet includes the payload of IP and an IP header, and the IP packet is used as a payload of MAC, and a MAC packet includes the payload of MAC and a MAC header. In this case, the video data packet provided in this embodiment of the present disclosure may be an RTP packet including a payload of RTP, an RTP header, and an RTP extension header.

The RTP extension header shown in FIG. 8 includes two fields a defined by file field and a length field. The two fields have a total of 4 bytes, as specified in the RTP protocol, the length field indicates a length of a remaining part of the extension header, and the length is measured in 4 bytes. In this embodiment of the present disclosure, a value of the length field is 1, to indicate that the length of the remaining part is 4 bytes. In other words, the video frame information may include 4 bytes. Information of any bit in the 4 bytes in the video frame information may be used to indicate the discard indication information.

The sending device performs the step of "adding the video frame information using an A2SP protocol" or "adding an RTP extension header after an RTP header using the RTP protocol, to add the video frame information" such that the video stream transmitted by the sending device to one or more network devices and the receiving device includes the video frame information. In this way, a video data packet received by the one or more network devices may include the video frame information, and a video stream received by the receiving device may also include the video frame information.

It should be noted that in the following embodiments, for ease of describing a video data packet and a frame type of a video frame to which video data encapsulated into the video data packet belongs, in some descriptions, a video data packet into which video data in a video frame whose frame type is the b frame is encapsulated may be referred to as a video data packet of a b frame type (namely, a first video data packet), a video data packet into which video data in a video frame whose frame type is the I frame is encapsulated may be referred to as a video data packet of an I frame type, a video data packet into which video data in a video frame whose frame type is the P frame is encapsulated may be referred to as a video data packet of a P frame type, and a video data packet into which video data in a video frame whose frame type is the reference B frame is encapsulated may be referred to as a video data packet of a reference B frame type. Different names of a same video data packet are merely used for ease of description, and do not constitute a limitation on the video data packet.

In a possible implementation, in the video transmission method provided in this embodiment of the present disclosure, the discard indication information included in video frame information added by the sending device to the second video data packet may further indicate discard priorities of the video data packet of the B frame type, the video data packet of the P frame type, and the video data packet of the I frame type. The discard indication information may be specifically a frame type of a video frame to which video data encapsulated into the video data packet belongs. Because based on the frame type, the b frame and the reference B frame, the P frame, and the I frame other than the b frame can be distinguished from each other, the discard indication information may be used to indicate a discard priority of the video data packet. Specifically, discard priorities indicated by discard indication information included in the video data packet of the b frame type, the video data packet of the reference B frame type, the video data packet of the P frame type, and the video data packet of the I frame type are in ascending order.

In this case, based on the discard indication information, not only a first video data packet (a video data packet of the b frame type) and a second video data packet in a video stream such as the source video stream can be distinguished from each other, but also a video data packet of the reference B frame type, a video data packet of the P frame type, and a video data packet of the I frame type in a second video data packet can be distinguished from each other. Therefore, after receiving the plurality of video data packets including the video frame information, the network element such as the network device or the receiving device may successively discard the video data packet of the b frame type, the video data packet of the reference B frame type, the video data packet of the P frame type, and the video data packet of the I frame type based on the discard indication information included in the video data packets. In this way, discard possibilities of the video data packet of the b frame type, the video data packet of the P frame type, the video data packet of the reference B frame type, and the video data packet of the I frame type are in descending order such that quality of the video stream transmitted in the transport network can be further improved.

For example, alternatively, the discard indication information D may be information of 2 bits. A value of D in the first video data packet (the video data packet of the b frame type) may be 11, and in the second video data packet, a value of D in the video data packet of the reference B frame may be 10, a value of D in the video data packet of the P frame type may be 01, and a value of D in the video data packet of the I frame type may be 00.

In this embodiment of the present disclosure, only an example in which the first video data packet and the second video data packet are distinguished from each other based on the discard indication information is used below to describe the video transmission method provided in this embodiment of the present disclosure, where the discard indication information is information of 1 bit, for example.

It should be noted that in the transport network, the sending device sends the source video stream to the network device adjacent to the sending device. Therefore, when the network device is adjacent to the sending device, the video transmission method shown in FIG. 6 may further include S602 and S603.

S602. The network device 1 receives the source video stream.

Step 602 may be performed by the network device adjacent to the sending device in the transport network. For example, with reference to FIG. 2 and FIG. 4, step 602 may be specifically performed by a communications interface 43 in the network device 1.

The network device 1 may transmit the source video stream to a downstream network device such that the video stream is transmitted to the receiving device. In a process of transmitting the video stream, the network device 1 may further perform step 603.

S603. The network device 1 discards one or more first video data packets based on the video frame information when determining that the network is congested.

With reference to FIG. 1 and FIG. 4, step 602 may be specifically performed by a processor 41 in the network device 1.

When the network device 1 determines that the network is congested in the process of transmitting the video stream by the network device 1, to transmit the source video stream to the downstream network device, the network device 1 may selectively discard one or more video data packets of the b frame type in the source video stream.

Figure 9:
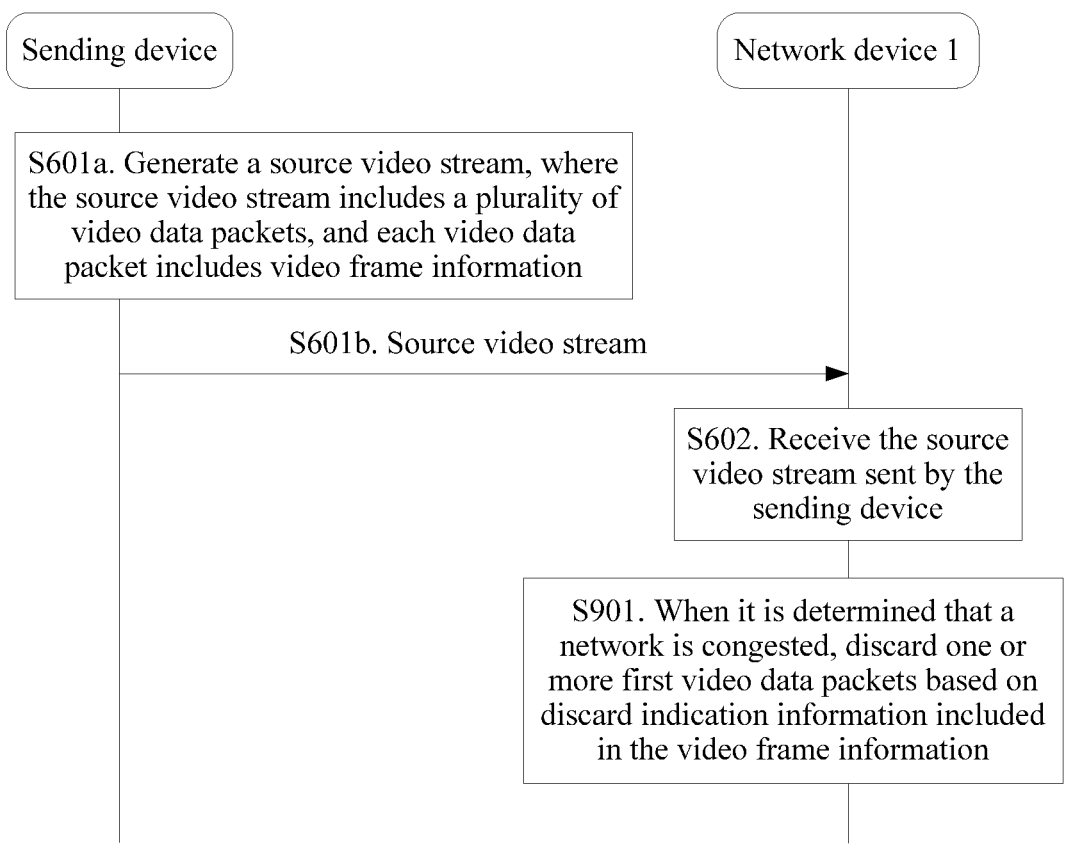
FIG. 9 is a flowchart 2 of a video transmission method according to an embodiment of the present disclosure.

It should be noted that when the video frame information includes the discard indication information, the network device 1 may determine, based on discard indication information of a video data packet, whether to discard the video data packet. Therefore, step 603 in the foregoing embodiment may be specifically step 901. For example, in a video transmission method shown in FIG. 9, step 603 shown in FIG. 6 may be specifically step 901.

S901. When determining that the network is congested, the network device 1 discards one or more first video data packets based on the discard indication information included in the video frame information.

For example, when the network is congested, because values of D in the video data packets 1 to 5 are all 0, the network device 1 may not discard the video data packets 1 to 5, and because values of D in the video data packets 11 to 16 are all 1, the network device 1 may selectively discard one or more of the video data packets 11 to 16.

It should be noted that when the network is congested, the network device 1 performs the step of "discarding one or more first video data packets in the source video stream", and the network device may not stop performing the step of "discarding one or more first video data packets in the source video stream" until the network is not congested. A more congested network results in a larger quantity of video data packets of the b frame type in the source video stream that are discarded by the network device.

It may be conceivable that a video stream obtained after the network device 1 performs step 603 or step 901 is an intermediate video stream. In the process of "discarding one or more first video data packets in the source video stream", only some video data packets of the b frame type in the video stream may be lost, or all video data packets of the b frame type in the video stream are lost. In addition, because a plurality of video data packets of the b frame type that are lost in the video stream may correspond to different b frames, the intermediate video stream may include an incomplete b frame. A video frame in which some video data packets are discarded and the other video data packets are not discarded is an incomplete video frame, and a video frame in which no video data packet is discarded is a complete video frame. For example, the network device 1 may discard only the video data packet 15 and the video data packet 16 corresponding to the video frame 3, or may discard all the video data packets 11 to 16 corresponding to the video frame 3.

Optionally, when network congestion is relatively serious, for example, when the network is still congested after all video data packets of the b frame type in the source video stream are discarded, the network device 1 may successively discard the video data packet of the reference B frame type, the video data packet of the P frame type, and the video data packet of the I frame type in the source video stream. This is not described in detail in this embodiment of the present disclosure, and can be easily implemented by a person skilled in the art.

In the video transmission method provided in this embodiment of the present disclosure, because the video frame information may include the discard indication information, the video stream received by the network device (for example, the network device 1) may include the video frame information. Therefore, the network device may distinguish the video data packet of the b frame type in the video stream from a video data packet of a frame type other than the b frame type based on the video frame information, and discard one or more video data packets of the b frame type in the video stream. In this way, the network device may preferentially discard the video data packet of the b frame type in the video stream, to ease network congestion. In addition, the network device may discard only the video data packet of the b frame type such that quality of the video stream transmitted to the receiving device can be improved. Further, a possibility that a phenomenon such as artifacts or frame freezing occurs when the video stream is played on a device such as a television can be reduced.

In addition, in the process of "encapsulating video data in a video stream into a plurality of video data packets by the sending device", a boundary of a video frame is a boundary of a video data packet. Therefore, in a process in which the network device discards one video data packet (for example, a video data packet of the b frame type), only quality of a video frame corresponding to the video data packet is affected, and quality of a video frame other than the video frame is not affected such that quality of the video stream output to the receiving device is further improved.

Further, when the network device is a router, the network device transmits the plurality of video data packets in the video stream one by one in a queue form. Network congestion of the network device is specifically congestion of a queue used to transmit a video data packet in the network device. When the network device receives the video stream, currently, a plurality of video data packets that are being transmitted may further exist in the queue of the network device. If a quantity of currently transmitted video data packets in a queue is excessively large, the queue may be congested. When a queue is congested, the network device may perform the step of "discarding one or more first video data packets" on video data packets subsequently transmitted in the queue.

Figure 10:
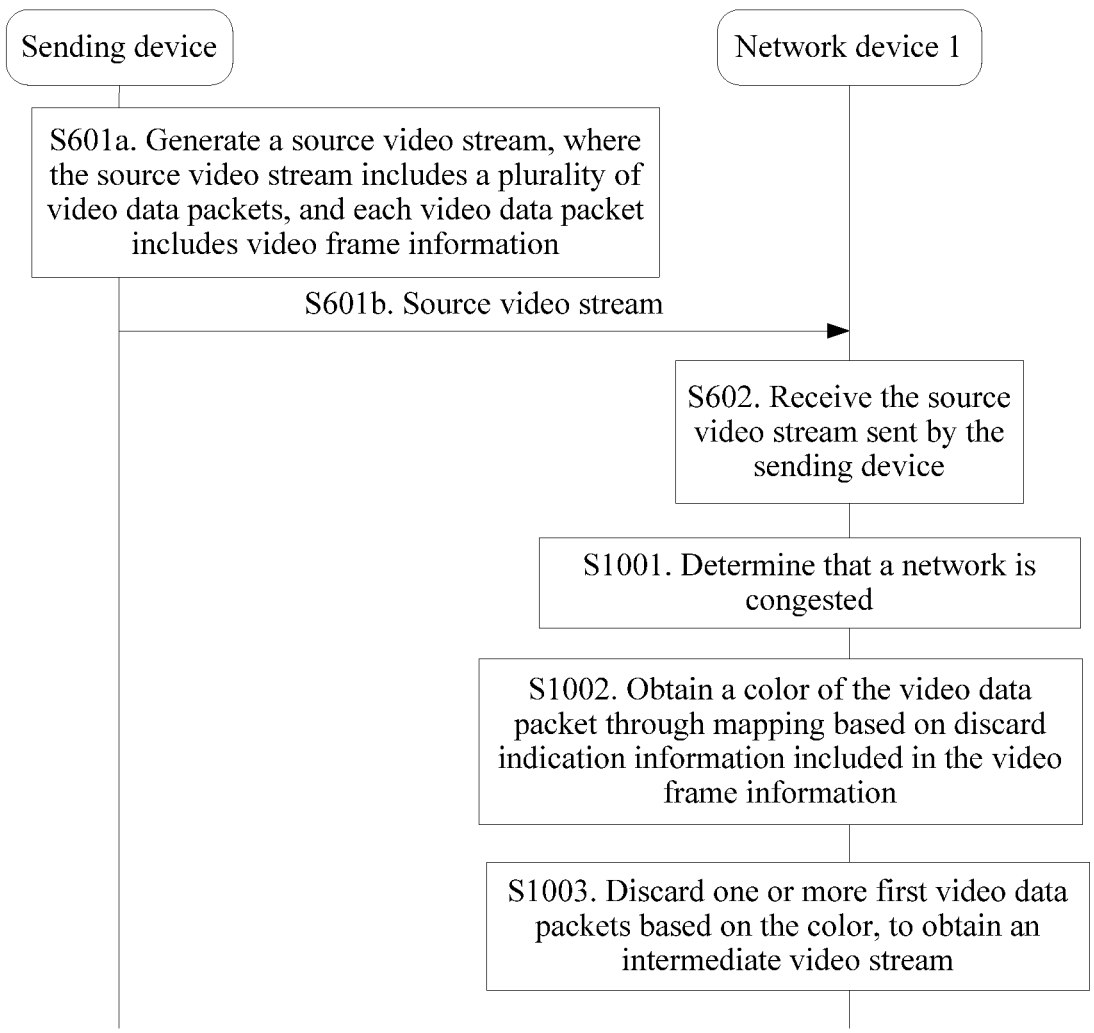
FIG. 10 is a flowchart 3 of a video transmission method according to an embodiment of the present disclosure.

In a possible implementation provided in this embodiment of the present disclosure, when the network device transmits the video data packets using a queue, step 901 in the foregoing embodiment may include step 1001 to step 1003. For example, in a video transmission method shown in FIG. 10, step 901 shown in FIG. 9 may include step 1001 to step 1003.

S1001. The network device 1 determines that the network is congested.

With reference to FIG. 1 and FIG. 4, step 1001 may be performed by a TM in the processor 41 in the network device 1.

For example, if the network device 1 detects that a length of a queue currently used to transmit a video data packet (referred to as a current queue) is greater than a specific threshold, the queue is congested. That a length of a current queue is greater than a specific threshold is that a quantity of video data packets in the queue is greater than the specific threshold. In this embodiment of the present disclosure, a value of the specific threshold is not limited, and the value does not affect implementation of the solution provided in this application.

After determining that the current queue is congested, the network device may add an internal label to each video data packet entering the current queue, to distinguish between internal transmission priorities of the video data packets on a network device side. The internal transmission priority of the video data packet may be used to indicate a priority of transmitting the video data packet by the network device.

Specifically, the internal label may include a color, used to indicate a discard level of a corresponding video data packet. For example, the color may include green and red. An internal transmission priority of a video data packet colored in green is the highest, and the network device 1 may most preferentially transmit the video data packet. An internal transmission priority of a video data packet colored in red is the lowest, and the network device 1 may selectively transmit the video data packet. In other words, when the network is congested, the network device 1 may preferentially discard the video data packet colored in red, and may not discard the video data packet colored in green.

Therefore, in the method provided in this embodiment of the present disclosure, the network device 1 may further perform step 1002. The network device 1 may perform step 1002 before or after step 1001, or may perform step 1001 and step 1002 simultaneously. This is not limited in this embodiment of the present disclosure. For example, in the method shown in FIG. 10, the network device 1 may perform step 1002 after step 1001.

S1002. The network device 1 obtains a color of the video data packet through mapping based on the discard indication information included in the video frame information.

With reference to FIG. 1 and FIG. 4, step 1001 may be performed by an NP in the processor 41 in the network device 1.

Figure 11:
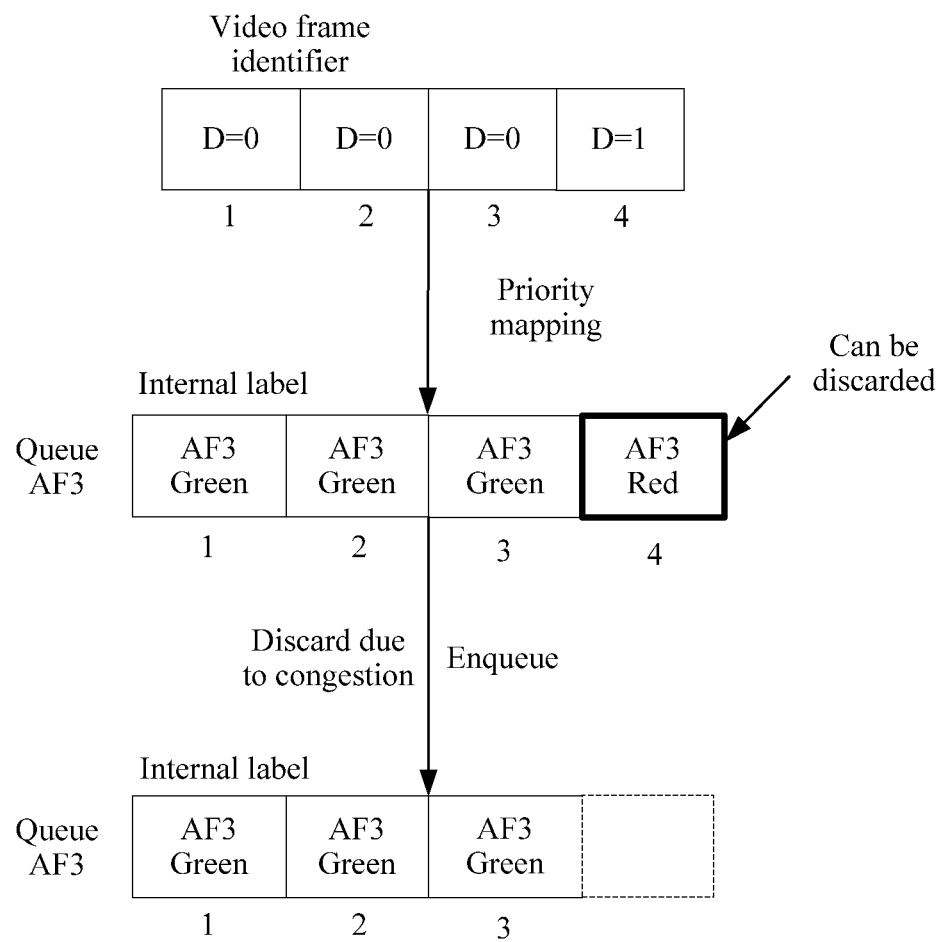
FIG. 11 is a schematic flowchart 1 of a video transmission process according to an embodiment of the present disclosure.

For example, FIG. 11 is a schematic flowchart of a video transmission process according to an embodiment of the present disclosure. The network device 1 may color video data packets 1 to 3 whose D has a value of 1 in red, that is, color video data packets of the b frame type in red, and color a video data packet 4 whose D has a value of 0 in green, that is, color a video data packet of the I frame type, a video data packet of the P frame type, or a video data packet of the reference B frame type in green.

S1003. The network device 1 discards the one or more first video data packets based on the color, to obtain an intermediate video stream.

With reference to FIG. 1 and FIG. 4, step 1003 may be performed by the TM in the processor 41 in the network device 1.

An internal transmission priority of the video data packet of the b frame type is the lowest, and the network device 1 may most preferentially discard the video data packet of the b frame type. Usually, the network device 1 does not discard a video data packet colored in green. As shown in FIG. 11, when the network is congested, the network device 1 may discard the video data packet 4. In this case, the network device 1 obtains an intermediate video stream, and the intermediate video stream includes the video data packets 1 to 3.

It should be noted that in the video transmission method provided in this embodiment of the present disclosure, because the video frame information added by the sending device to the video data packet includes the discard indication information, the network device may obtain an internal label (for example, a color) of the video data packet based on the video frame information in the video data packet. Therefore, the network device may add internal labels to video data packets, to distinguish between internal transmission priorities of the video data packets on the network device side. Then the network device may distinguish the video data packet of the b frame based on the internal transmission priorities. In this way, the network device can discard one or more video data packets of the b frame type, to ease network congestion and improve quality of the output video stream.

Further, in a possible implementation of this embodiment of the present disclosure, when adding the video frame information to the video data packet, the sending device may further enable the video frame information to include priority indication information (PRI), to indicate a transmission priority of the video data packet, namely, a transmission priority of the video data packet on a sending device side. The priority indication information in the video data packet may be determined based on a service priority or a user priority of a video stream in which the video data packet is located. For example, in terms of the service priority, a transmission priority of a video data packet in a video stream in a 4K format is relatively high, a transmission priority of a video data packet in a video stream in a high-definition format is the second highest, and a transmission priority of a video data packet in a video stream in a standard-definition format is relatively low. For the user priority, a transmission priority of a video data packet in a video stream of a very important person (VIP) user is relatively high, and a transmission priority of a video data packet in a video stream of a common user is relatively low.

For example, PRI may be information of 4 bits, a value of PRI may be any one of 0000 to 1111, and PRI with a larger value corresponds to a video data packet with a higher transmission priority. For example, a value of PRI of a video data packet may be 00, 01, or 10, and transmission priorities of video data packets whose PRI has values of 00, 01, and 10 are in ascending order. Values of PRI in video data packets in a same video stream are the same. For example, values of PRI in video data packets in one video stream are all 00. In this case, any four bits in the 4 bytes in the video frame information shown in FIG. 7 or FIG. 8 may be used to indicate the priority indication information.

Therefore, the network device (for example, the network device 1) may further add an internal label to the video data packet based on PRI of the video data packet. Specifically, the internal label may further include a service class, used to indicate a level of a queue through which the network device transmits a video data packet.

Generally, the network device may include one or more queues, and different queues have different levels. For example, some queues have a relatively high level, and a video data packet in the queue may be preferentially transmitted, in other words, a service level of the video data packet is relatively high, and some queues have a relatively low level, and a video data packet in the queue is not preferentially transmitted, in other words, a service level of the video data packet is relatively low. A service level of a video data packet may be a label of a queue, for example, AF1, AF2, or AF3. Levels of a queue AF1, a queue AF2, and a queue AF3 are in ascending order, and service levels of a video data packet in the queue AF1, a video data packet in the queue AF2, and a video data packet in the queue AF3 are in ascending order.

Figure 12:
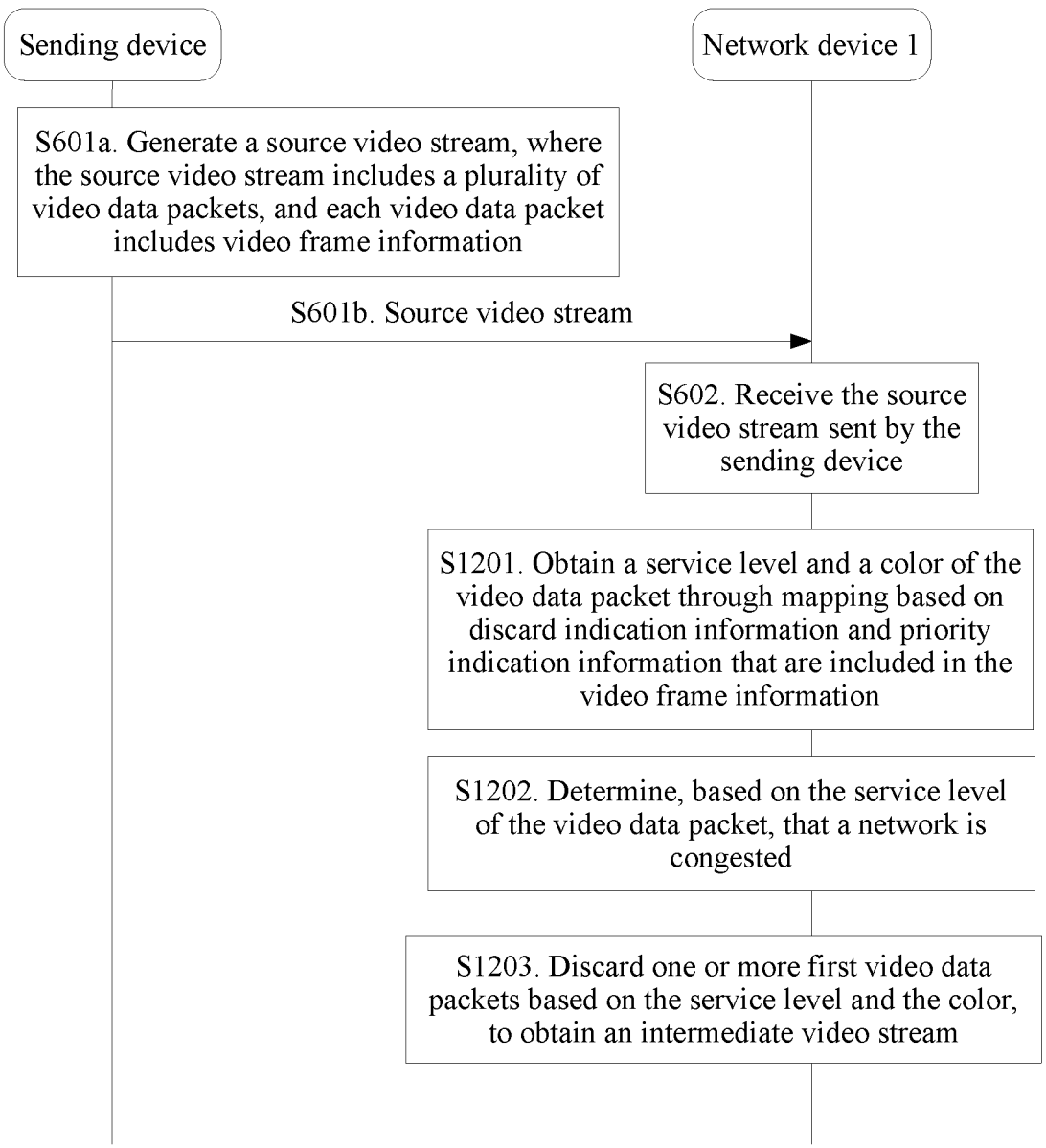
FIG. 12 is a flowchart 4 of a video transmission method according to an embodiment of the present disclosure.

In a possible implementation provided in this embodiment of the present disclosure, step 603 may include step 1201 to step 1203. In a video transmission method shown in FIG. 12, step 603 shown in FIG. 6 may further include step 1201 to step 1203.

S1201. The network device 1 obtains a service level and a color of the video data packet through mapping based on the discard indication information and priority indication information that are included in the video frame information.

With reference to FIG. 1 and FIG. 4, step 1201 may be performed by an NP in the processor 41 in the network device 1.

Figure 13:
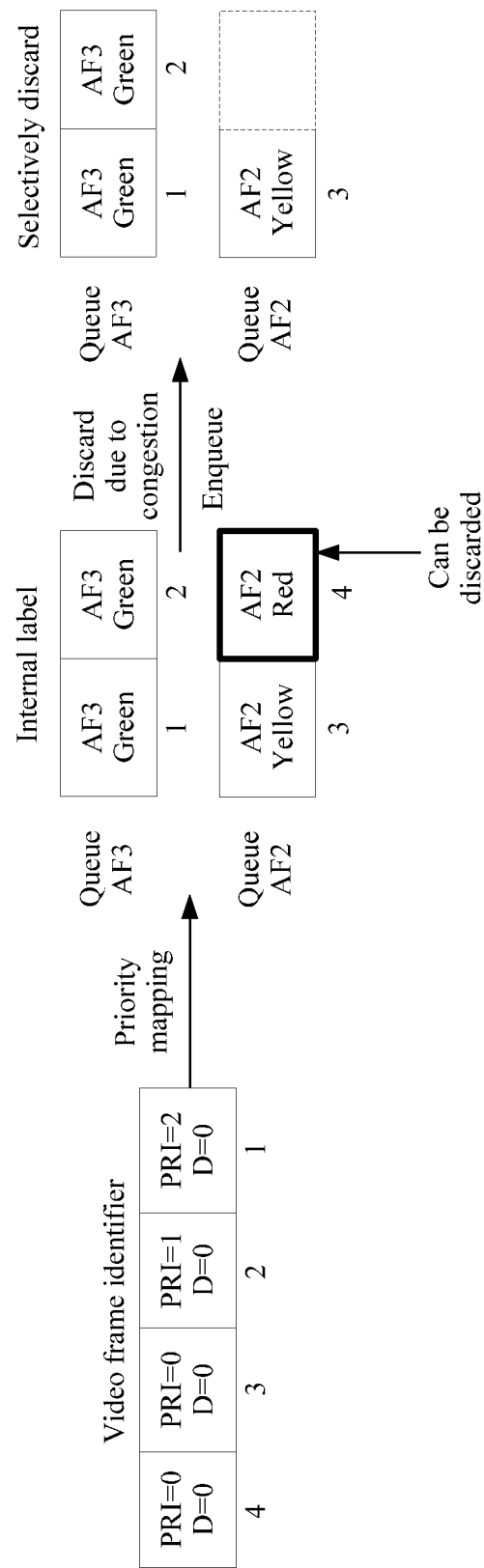
FIG. 13 is a schematic flowchart 2 of a video transmission process according to an embodiment of the present disclosure.

For example, FIG. 13 is a schematic flowchart of another video transmission process according to an embodiment of the present disclosure. A video data packet whose PRI has a larger value may enter a queue with a higher level for transmission. For example, in FIG. 13, video data packets whose PRI has values of 1 and 2 may enter a queue AF3 for transmission, and video data packets whose PRI has a value of 0 may enter a queue AF2 for transmission. In other words, service levels of a video data packet 1 and a video data packet 2 are both AF3, and service levels of a video data packet 3 and a video data packet 4 are both AF2.

Optionally, the color may be yellow in addition to green and red. An internal transmission priority of a video data packet colored in yellow falls between that of a video data packet colored in green and that of a video data packet colored in red, and the network device 1 may second most preferentially transmit the video data packet.

The network device 1 may obtain the color of the video data packet based on the discard indication information and the priority indication information. Specifically, as shown in FIG. 13, the network device 1 may color, in green, the video data packet 1 and the video data packet 2 whose PRI has a relatively large value and whose D has a value of 0, color, in yellow, the video data packet 3 whose PRI has a relatively small value and whose D has a value of 0, and color, in red, the video data packet 3 whose PRI has a relatively small value and whose D has a value of 1.

In conclusion, the network device 1 may determine an internal transmission priority of a video data packet on a network device side based on a service level and a color of the video data packet. For example, an internal transmission priority of a video data packet whose service level is AF3 and that is colored in green is the highest, an internal transmission priority of a video data packet whose service level is AF2 and that is colored in yellow is the second highest, and an internal transmission priority of a video data packet whose service level is AF2 and that is colored in red is the lowest. In FIG. 13, internal transmission priorities of the video data packet 1, the video data packet 2, the video data packet 3, and the video data packet 4 are in descending order. Internal transmission priorities of different video data packets in a same queue may be determined based on colors. For example, in the queue AF2, an internal transmission priority of a video data packet colored in yellow is higher than that of a video data packet colored in red.

S1202. The network device 1 determines, based on the service level of the video data packet, that the network is congested.

Specifically, for a queue in which a video data packet with a higher service level is located, a video data packet quantity threshold used to determine that the queue is congested is larger, and for a queue in which a video data packet with a lower service level is located, a video data packet quantity threshold used to determine that the queue is congested is smaller. For example, for a queue AF3 in which a video data packet whose service level is AF3 is located, the threshold may be 35, and for a queue AF2 in which a video data packet whose service level is AF2 is located, the threshold may be 20. Therefore, when the network is congested, the network device 1 may preferentially discard the video data packet in the queue AF2, to ease network congestion.

S1203. The network device 1 discards the one or more first video data packets based on the service level and the color, to obtain an intermediate video stream.

With reference to FIG. 1 and FIG. 4, both step 1202 and step 1203 may be performed by a TM in the processor 41 in the network device 1.

When the network is congested, the network device 1 may discard a video data packet with a lowest internal transmission priority, namely, a video data packet of the b frame type. As shown in FIG. 13, when the network is congested, the network device 1 may discard the video data packet 4 whose service level is AF2 and that is colored in red, that is, discard a video data packet of the b frame type. In this case, the network device 1 obtains an intermediate video stream, and the intermediate video stream includes the video data packets 1 to 3.

A weighted random early detection (WRED) algorithm may be used in step 1202 and step 1203. When selectively discarding a video data packet (for example, a video data packet of the b frame type) using the algorithm, the network device (for example, the network device 1) may process one or more video data packets in different queues. In this way, fairness between different queues is implemented, and the network device can fairly process different video streams.

It should be noted that in the video transmission method provided in this embodiment of the present disclosure, because the video frame information added by the sending device to the video data packet includes the discard indication information and the priority indication information, the network device (for example, the network device 1) may obtain the internal label (for example, the color and the service level) of the video data packet based on the video frame information in the video data packet. Therefore, the network device may add internal labels to video data packets, to obtain internal transmission priorities of the video data packets on the network device side. Then the network device may distinguish the video data packet of the b frame type from a video data packet of another frame type based on the internal transmission priorities. In this way, the network device can discard one or more video data packets of the b frame type more accurately, to ease network congestion and further improve quality of the output video stream.

Further, in a possible implementation of this embodiment of the present disclosure, when adding the video frame information to the video data packet, the sending device may further enable the video frame information to include frame number indication information (denoted as B), to indicate a number of a video frame in which the corresponding video data packet is located. In a process of encapsulating a video data packet for each video stream, the sending device may successively number all video frames, and frame number indication information of different video data packets in a same video frame is the same. For example, B may be information of 2 bits, and a value of B may be a value in 00 to 11. In this case, any two bits in the 4 bytes in the video frame information shown in FIG. 7 or FIG. 8 may be used to indicate the frame number indication information.

Figure 14:
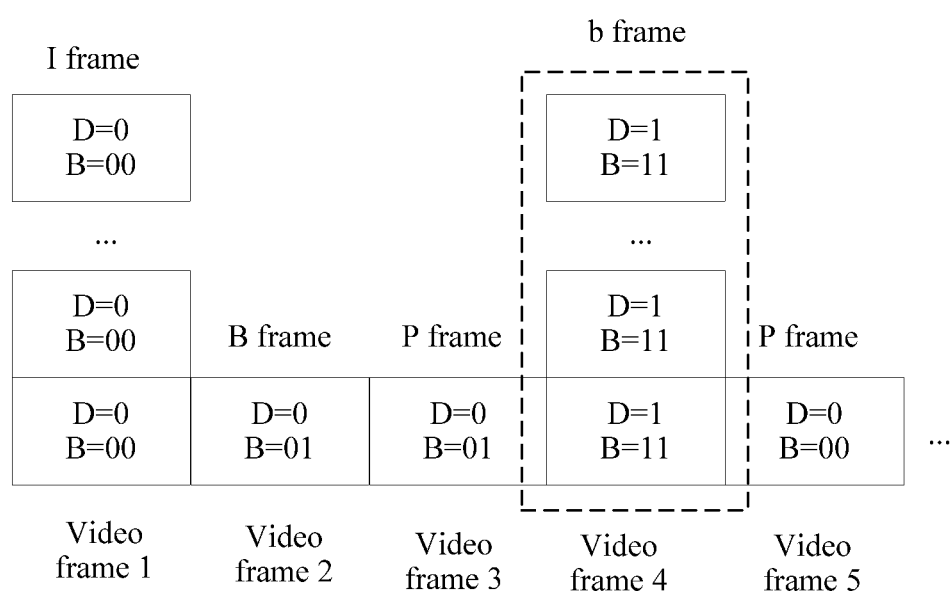
FIG. 14 is a schematic diagram 1 of a video stream according to an embodiment of the present disclosure.

For example, FIG. 14 is a schematic diagram of a video stream according to an embodiment of the present disclosure. Because priority indication information of different video data packets in the video stream is the same, PRI of the video data packet is not shown in FIG. 11. In FIG. 14, when B is information of 2 bits, values of B in video frames 1 to 4 are respectively 00, 01, 10, and 11, and a value of 00 is assigned to B in a video frame 5 again. By analogy, values of B in video frames following the video frame 5 are successively 01, 10, and 11. Then another round of value assignment is performed.

Further, in the video transmission method provided in this embodiment of the present disclosure, the network device 1 may selectively discard one or more video data packets of the b frame type based on the discard indication information, the priority indication information, and the frame number indication information that are included in the video data packet.

Figure 15:
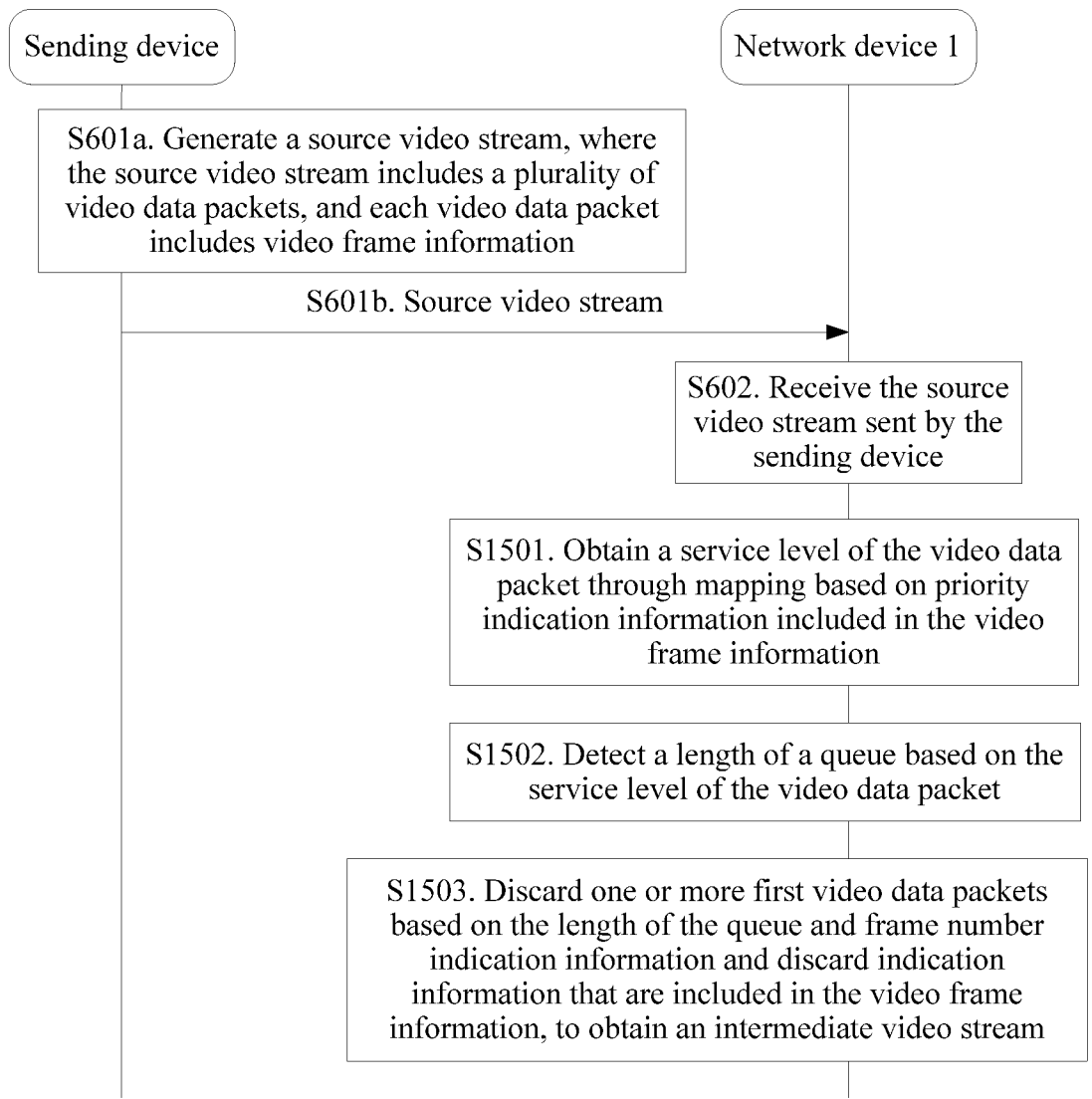
FIG. 15 is a flowchart 5 of a video transmission method according to an embodiment of the present disclosure.

Specifically, step 603 may further include step 1501 to step 1503. In a video transmission method shown in FIG. 15, step 603 shown in FIG. 6 may further include step 1501 to step 1503.

S1501. The network device 1 obtains a service level of the video data packet through mapping based on priority indication information included in the video frame information.

With reference to FIG. 1 and FIG. 4, step 1501 may be performed by an NP in the processor 41 in the network device 1.

Figure 16:
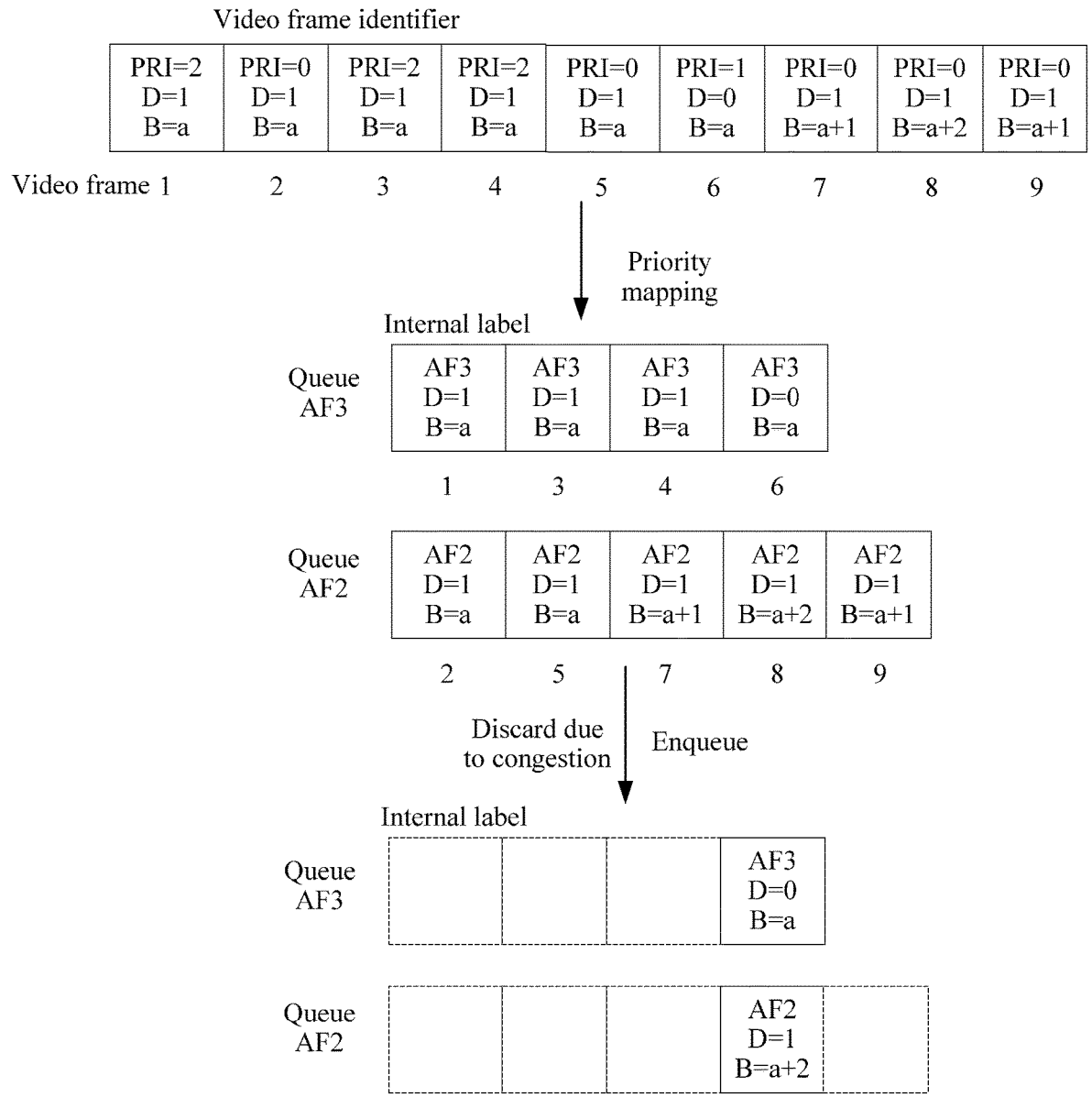
FIG. 16 is a schematic flowchart 3 of a video transmission process according to an embodiment of the present disclosure.

For example, in a schematic flowchart of a video transmission process shown in FIG. 16, the network device 1 may place video data packets whose PRI has values of 01 and 10 in a queue AF3 for transmission, and place video data packets whose PRI has a value of 00 in a queue AF2 for transmission. In an embodiment, service levels added by the network device 1 to video data packets 1, 3, 4, and 6 in FIG. 16 are all AF3, and service levels added by the network device 1 to video data packets 2, 5, 7, 8, and 9 in FIG. 16 are all AF2.

S1502. The network device 1 detects a length of a queue based on the service level of the video data packet.

The network device may perform step 1502 on each of one or more queues for transmitting a video data packet in the network device. For example, the network device may detect a length of the queue AF3 and a length of the queue AF2 shown in FIG. 16, in other words, detect a quantity of currently transmitted video data packets in the queue AF3 and a quantity of currently transmitted video data packets in the queue AF2. For example, if a service level of a currently transmitted video data packet is AF3, the network device detects the length of the queue AF3.

S1503. The network device 1 discards the one or more first video data packets based on the length of the queue and frame number indication information and the discard indication information that are included in the video frame information, to obtain an intermediate video stream.

With reference to FIG. 1 and FIG. 4, both step 1502 and step 1503 may be performed by a TM in the processor 41 in the network device 1.

Specifically, the network device 1 may set length thresholds of one or more queues based on the frame number indication information. If the frame number indication information is information of i bits, a quantity of values of the frame number indication information is $2^i$, where i is a positive integer. The network device 1 may divide one or more video data packets of the b frame type into $2^i$ parts based on the frame number indication information included in the video data packet of the b frame type, and frame number indication information included in all parts of video data packet of the b frame type is the same.

In this case, the queue length threshold may include $2^i$ values that are denoted as X_1, X_2, X_3, . . . , and X_$2^i$. X_1, X_2, X_3, . . . , and X_$2^i$ are all positive integers, and values of X_1, X_2, X_3, . . . , and X_$2^i$ are in ascending order. A specific value of the threshold does not affect implementation of the purpose of this application. The threshold is not further limited in this embodiment of the present disclosure. For example, the threshold may be 20 to 50. Then, when a length of a current queue reaches different thresholds, the network device 1 may selectively discard some video data packets of the b frame type. For example, when the length of the current queue reaches the threshold X_1, the network device 1 may selectively discard video data packets of the b frame type whose B is one value. When the length of the current queue reaches the threshold X_7, the network device 1 may selectively discard video data packets of the b frame type whose B is seven different values.

Figure 17:
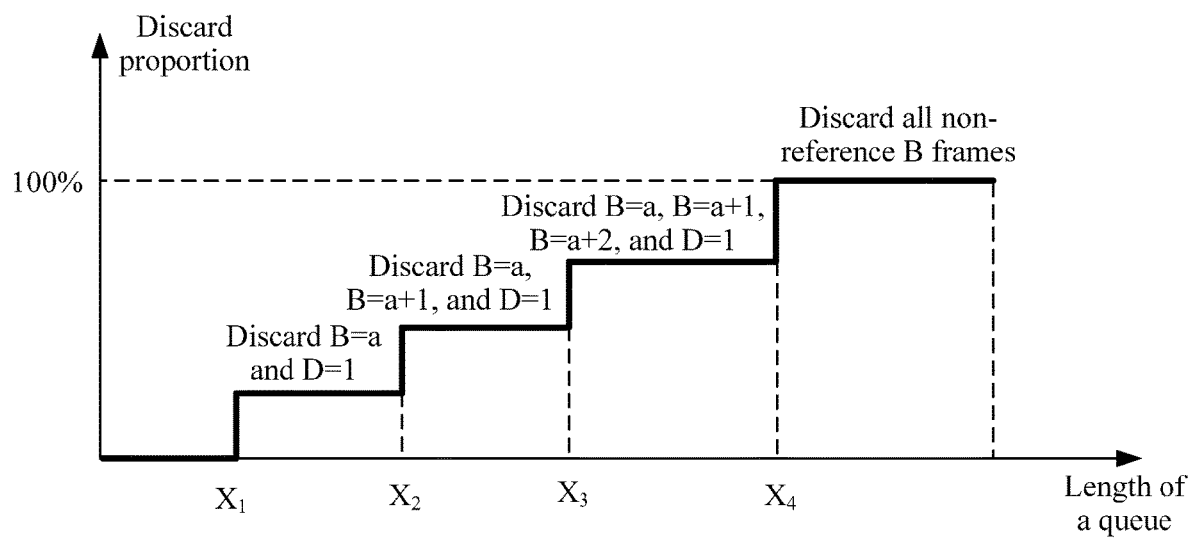
FIG. 17 is a schematic diagram of a discard process of a video data packet according to an embodiment of the present disclosure.

For example, in a schematic diagram of a discard process of a video data packet shown in FIG. 17, frame number indication information is information of 2 bits. In an embodiment, a value of B is 00, 01, 10, or 11. The length thresholds of the one or more queues may include four thresholds such as a threshold X1, a threshold X2, a threshold X3, and a threshold X4.

When a length of a current queue reaches the threshold X_1, the network device 1 may discard a video data packet whose B has a value of a and whose D has a value of 1 (namely, a video data packet of the b frame type), where a may be any one of 00, 01, 10, and 11. When the length of the current queue reaches the threshold X_2, the network device 1 may discard video data packets whose B has values of a and a+1 and whose D has a value of 1. When the length of the current queue reaches the threshold X_3, the network device 1 may discard video data packets whose B has values of a, a+1, and a+2 and whose D has a value of 1. When the length of the current queue reaches the threshold X_4, the network device 1 may discard all video data packets whose D has a value of 1. In this case, a proportion of discarding video data packets of the b frame type by the network device 1 may reach 100%.

Certainly, after a video data packet of the b frame type is selectively discarded, the network may not be congested before the network device 1 discards all corresponding video data packets of the b frame. In this case, the network device 1 may stop performing the step of "discarding one or more first video data packets", and obtain an intermediate video stream.

It should be noted that in the video transmission method provided in this embodiment of the present disclosure, the video frame information added by the sending device to the video data packet may include the frame number indication information, to divide a plurality of video data packets into different parts. In addition, when distinguishing the video data packet of the b frame type, the network device may further distinguish between different parts in one or more video data packets of the b frame type, and discard some specified video data packets in the one or more video data packets of the b frame type based on a network congestion degree. In this way, in a process of discarding a video data packet of the b frame type by the network device (for example, the network device 1), a quantity of affected video streams can be reduced, and quality of the video stream transmitted to the receiving device is further improved.

In a possible implementation, after obtaining the intermediate video stream, the network device (namely, the network device 1) adjacent to the sending device may transmit the intermediate video stream to a downstream network device. Then, after receiving the intermediate video stream transmitted by the upstream network device of the downstream network device, the downstream network device may also selectively discard one or more video data packets of the b frame type in the intermediate video stream.

Specifically, in a possible implementation provided in this embodiment of the present disclosure, after obtaining the intermediate video stream, the network device 1 adjacent to the sending device may further perform step 1801.

S1801. The network device 1 sends the intermediate video stream to a downstream network device 2 of the network device 1.

With reference to FIG. 1 and FIG. 4, step 1801 may be performed by a TM in a processor 41 in the network device 2.

Correspondingly, network devices other than the network device adjacent to the sending device in the one or more network devices may all perform step 1801. After step 1503 shown in FIG. 15, a video transmission method shown in FIG. 18A and FIG. 18B may further include step 1801 and step 1802.

S1802. The network device 2 receives the intermediate video stream sent by the upstream network device 1.

As shown in FIG. 1, the network device 2 is a downstream network device of the network device 1.

It should be noted that because in this embodiment of the present disclosure, the network may be congested when one or more network devices such as the network device 1, the network device 2, and the network device N in FIG. 1 transmit a video stream, each of the network device 2, the network device N, and the like may discard one or more video data packets of the b frame type when the network is congested.

Specifically, after performing step 1802, the network device 2 may further perform step 603*a*, step 901, step 1001*a* to step 1003*a*, step 1201*a* to step 1203*a*, or step 1501*a* to step 1503*a*. The video transmission method shown in FIG. 18A and FIG. 18B may further include step 1501*a* to step 1503*a* after step 1802.

S603*a*. The network device 2 discards one or more first video data packets based on video frame information when determining that the network is congested.

S901*a*. When determining that the network is congested, the network device 2 discards one or more first video data packets based on discard indication information included in video frame information.

S1001*a*. The network device 2 determines that the network is congested.

S1002*a*. The network device 2 obtains a color of a video data packet through mapping based on discard indication information included in video frame information.

S1003*a*. The network device 2 discards one or more first video data packets based on the color, to obtain an intermediate video stream.

S1201*a*. The network device 2 obtains a service level and a color of a video data packet through mapping based on discard indication information and priority indication information that are included in video frame information.

S1202*a*. The network device 2 determines, based on the service level of the video data packet, that the network is congested.

S1203*a*. The network device 2 discards one or more first video data packets based on the service level and the color, to obtain an intermediate video stream.

S1501*a*. The network device 2 obtains a service level of a video data packet through mapping based on priority indication information included in video frame information.

S1502*a*. The network device 2 detects a length of a queue based on the service level of the video data packet.

S1503*a*. The network device 2 discards one or more first video data packets based on the length of the queue and frame number indication information and discard indication information that are included in the video frame information, to obtain an intermediate video stream.

Certainly, to transmit the video stream to a downstream network device of the network device 2, the network device 2 may further perform step 1801*a* after obtaining the intermediate video stream.

S1801*a*. The network device 2 sends the intermediate video stream to the downstream network device of the network device 2.

It should be noted that for detailed descriptions of step 603*a*, step 901*a*, step 1001*a* to step 1003*a*, step 1201*a* to step 1203*a*, step 1501*a* to step 1503*a*, and step 1801*a*, reference may be made to detailed descriptions of step 603, step 901, step 1001 to step 1003, step 1201 to step 1203, step 1501 to step 1503, and step 1801 respectively in the foregoing embodiments, and details are not described again in this embodiment of the present disclosure. In this embodiment of the present disclosure, different numbers are used to describe the foregoing steps only for convenience of describing different execution bodies, and the numbers do not affect a purpose achieved in each step.

With reference to FIG. 1 and FIG. 4, step 1501*a* may be performed by an NP in the processor 41 in the network device 2, and step 1502*a* and step 1503*a* may be performed by the TM in the processor 41 in the network device 2. Step 1801*a* may be performed by a communications interface 43 in the network device 2.

Similarly, a network device adjacent to the receiving device in the transport network, for example, the network device N shown in FIG. 1, may perform step 1802N. Then the network device N may further perform step 603N, step 901N, step 1001N to step 1003N, step 1201N to step 1203N, or step 1501N to step 1503N. For example, the schematic diagram of the method shown in FIG. 18A and FIG. 18B may further include step 1802N and step 1501N to step 1503N.

S1802N. The network device N receives an intermediate video stream sent by an upstream network device.

S603N. The network device N discards one or more first video data packets based on video frame information when determining that the network is congested.

S901N. When determining that the network is congested, the network device N discards one or more first video data packets based on discard indication information included in video frame information.

S1001N. The network device N determines that the network is congested.

S1002N. The network device N obtains a color of a video data packet through mapping based on discard indication information included in video frame information.

S1003N. The network device N discards one or more first video data packets based on the color, to obtain an intermediate video stream.

S1201N. The network device N obtains a service level and a color of a video data packet through mapping based on discard indication information and priority indication information that are included in video frame information.

S1202N. The network device N determines, based on the service level of the video data packet, that the network is congested.

S1203N. The network device N discards one or more first video data packets based on the service level and the color, to obtain an intermediate video stream.

S1501N. The network device N obtains a service level of a video data packet through mapping based on priority indication information included in video frame information.

S1502N. The network device N detects a length of a queue based on the service level of the video data packet.

S1503N. The network device N discards one or more first video data packets based on the length of the queue and frame number indication information and discard indication information that are included in the video frame information, to obtain an intermediate video stream.

Likewise, for detailed descriptions of step 603N, step 901N, step 1001N to step 1003N, step 1201N to step 1203N, and step 1501N to step 1503N, and step 1801N, reference may be made to detailed descriptions of step 603, step 901, step 1001 to step 1003, step 1201 to step 1203, step 1501 to step 1503, and step 1801 respectively in the foregoing embodiments, and details are not described again in this embodiment of the present disclosure.

With reference to FIG. 1 and FIG. 4, step 1501N may be performed by an NP in a processor 41 in the network device N, and step 1502N and step 1503N may be performed by a TM in the processor 41 in the network device N. Step 1802N may be performed by a communications interface 43 in the network device N.

It should be noted that when the network is congested, each of one or more network devices in the transport network may preferentially discard one or more video data packets of the b frame in a video stream transmitted by the network device such that the video stream generated by the sending device can be transmitted to the receiving device using the one or more network devices.

Further, in a possible implementation of this embodiment of the present disclosure, when adding the video frame information to the video data packet, the sending device may further enable the video frame information to include frame length indication information (denoted as L), to indicate a length of a video frame in which the corresponding video data packet is located, namely, a quantity of video data packets in the video frame. Frame length indication information of different video data packets in a same video frame is the same. L may be information of 26 bits, and a value of L of a plurality of video data packets may be any one of 0 to $2^{26}$. In this case, any 26 bits in the 4 bytes in the video frame information shown in FIG. 7 or FIG. 8 may be used to indicate the frame number indication information.

Figure 19:
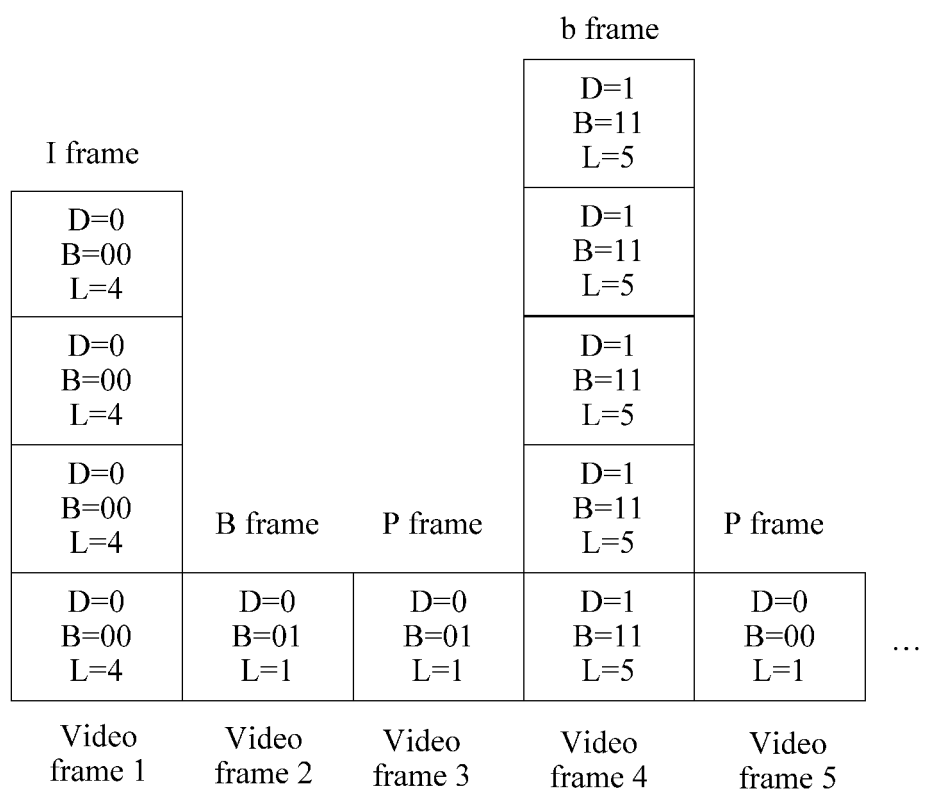
FIG. 19 is a schematic diagram 2 of a video stream according to an embodiment of the present disclosure.

For example, FIG. 19 is a schematic diagram of another video stream according to an embodiment of the present disclosure. In FIG. 19, a value of L of a video data packet in a video frame 1 is 4, a value of L of a video data packet in a video frame 2 is 1, a value of L of a video data packet in a video frame 3 is 1, a value of L of a video data packet in a video frame 4 is 5, and a value of L of a video data packet in a video frame 5 is 1.

In addition, the video data packet may further include a sequence number (denoted as M) of the video data packet. For example, video data packets in one video stream are successively numbered. For example, M may also be information of 26 bits, and values of M of a plurality of video data packets may be successively 0 to $2^{26}$, and values of M of video data packets following a video data packet whose M is $2^{26}$ may be 0 to $2^{26}$ again. A sequence number of a video data packet in a video stream may be used to indicate whether a video data packet is lost in the video stream.

The sequence number of the video data packet may be carried in the RTP header shown in FIG. 6 or FIG. 7. Specifically, in a process of encapsulating video data in a video stream into one or more video data packets, the sending device may successively number the video data packets, and add a sequence number of the video data packet using an RTP header.

It should be noted that the network device (for example, the network device 1 or the network device 2) performs the step of "discarding one or more first video data packets" when the network is congested, and when the network device stops performing the step of "discarding one or more first video data packets", some video frames may be incomplete. Therefore, the network device adjacent to the receiving device may further discard a video data packet that is not discarded in the incomplete video frame, namely, a video data packet of the b frame type that is not discarded. Then the network device obtains a to-be-decoded video stream, and all video frames included in the to-be-decoded video stream are complete video frames.

Figure 18A:
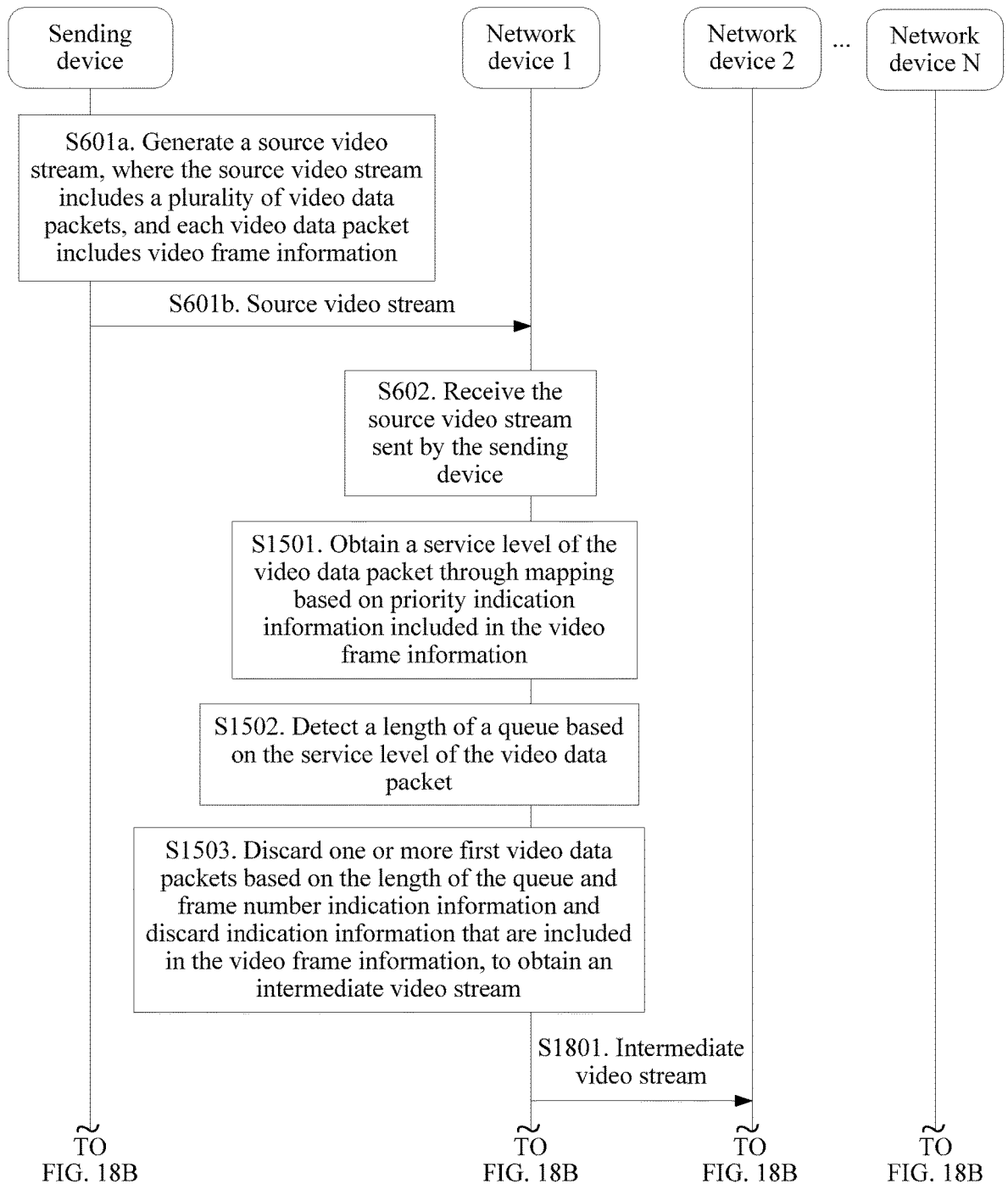
FIG. 18A is a flowchart 6 of a video transmission method according to an embodiment of the present disclosure.
Figure 18B:
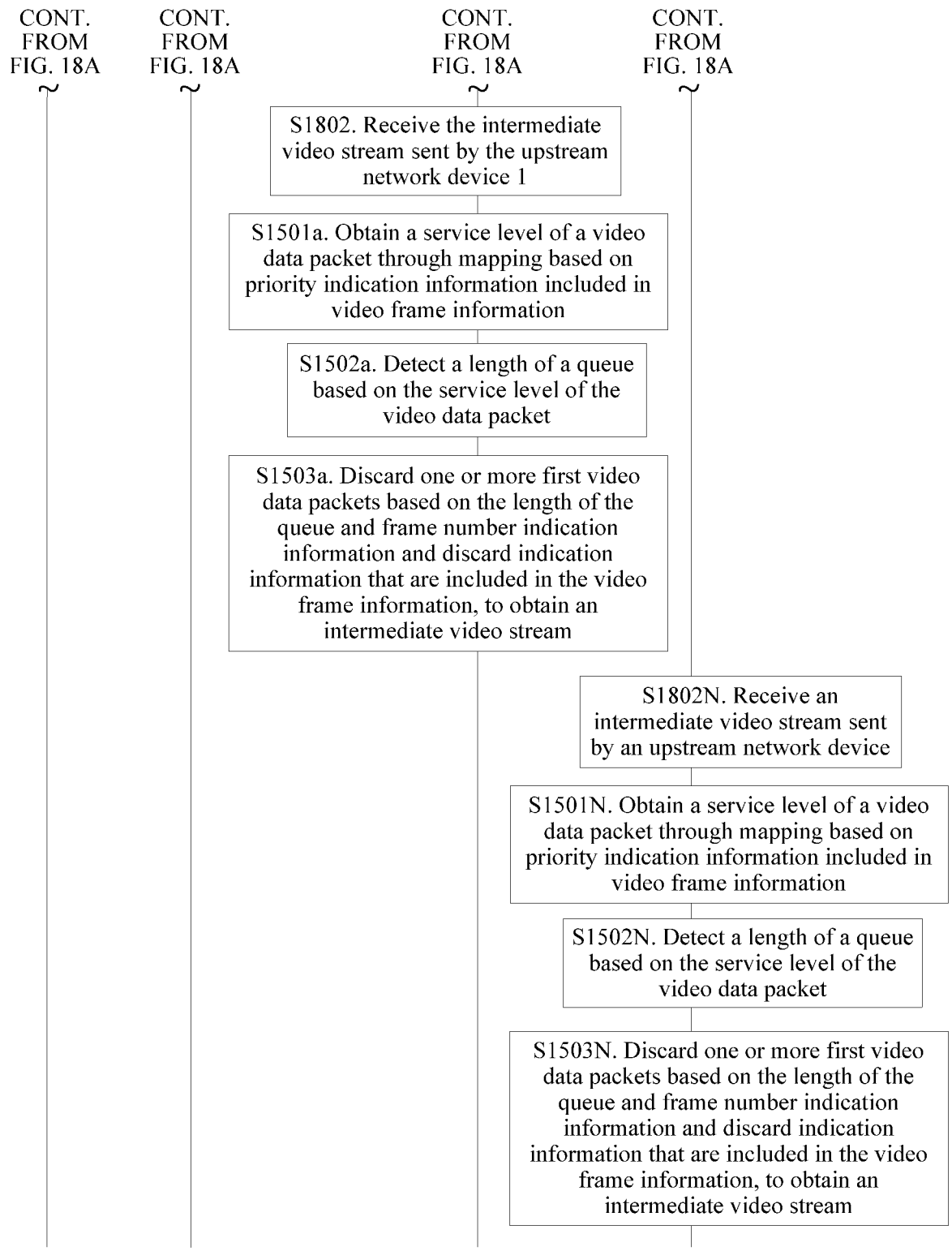
FIG. 18B is a continuation of the flowchart 6 of a video transmission method according to an embodiment of the present disclosure.
Figure 20A:
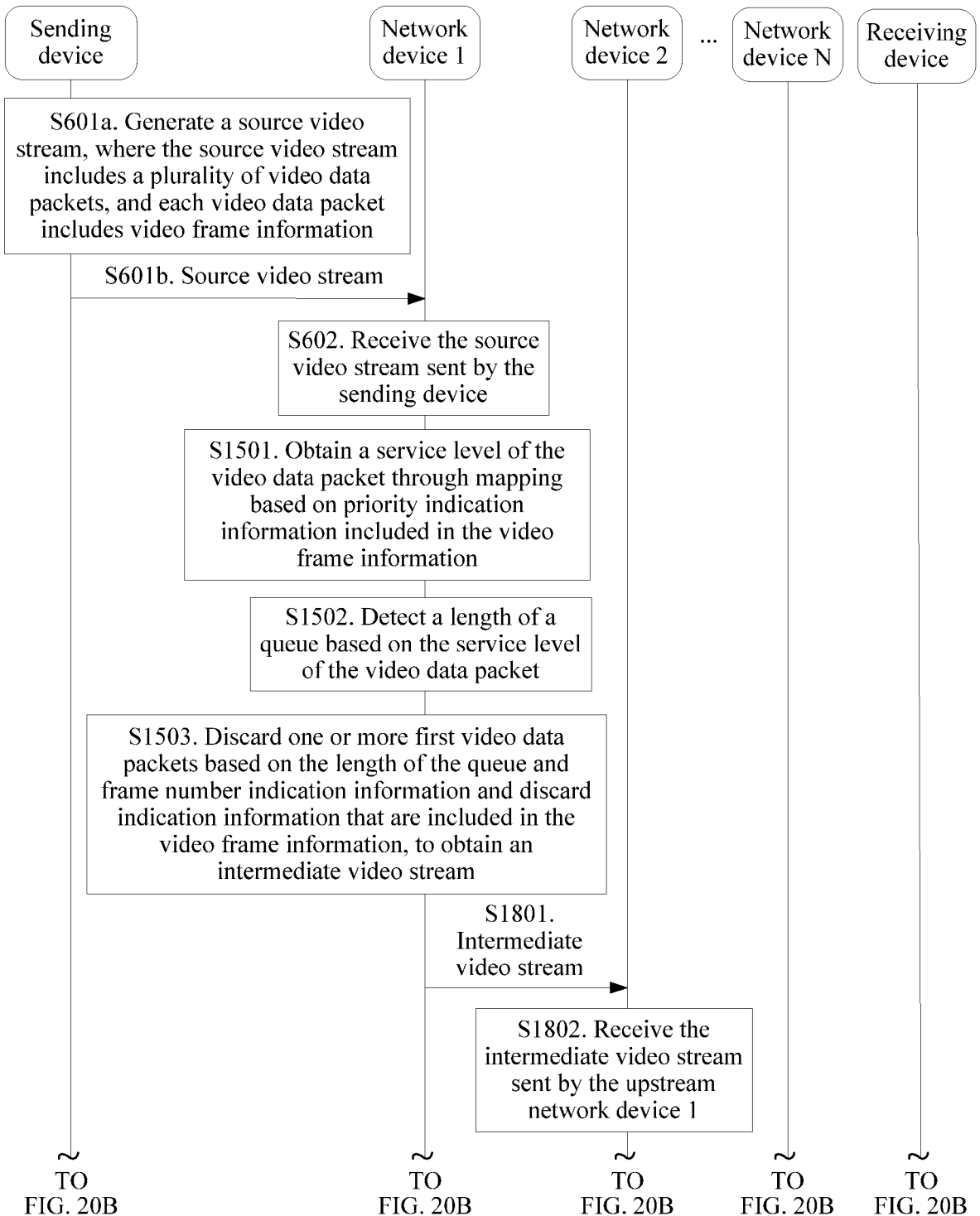
FIG. 20A is a flowchart 7 of a video transmission method according to an embodiment of the present disclosure.
Figure 20B:
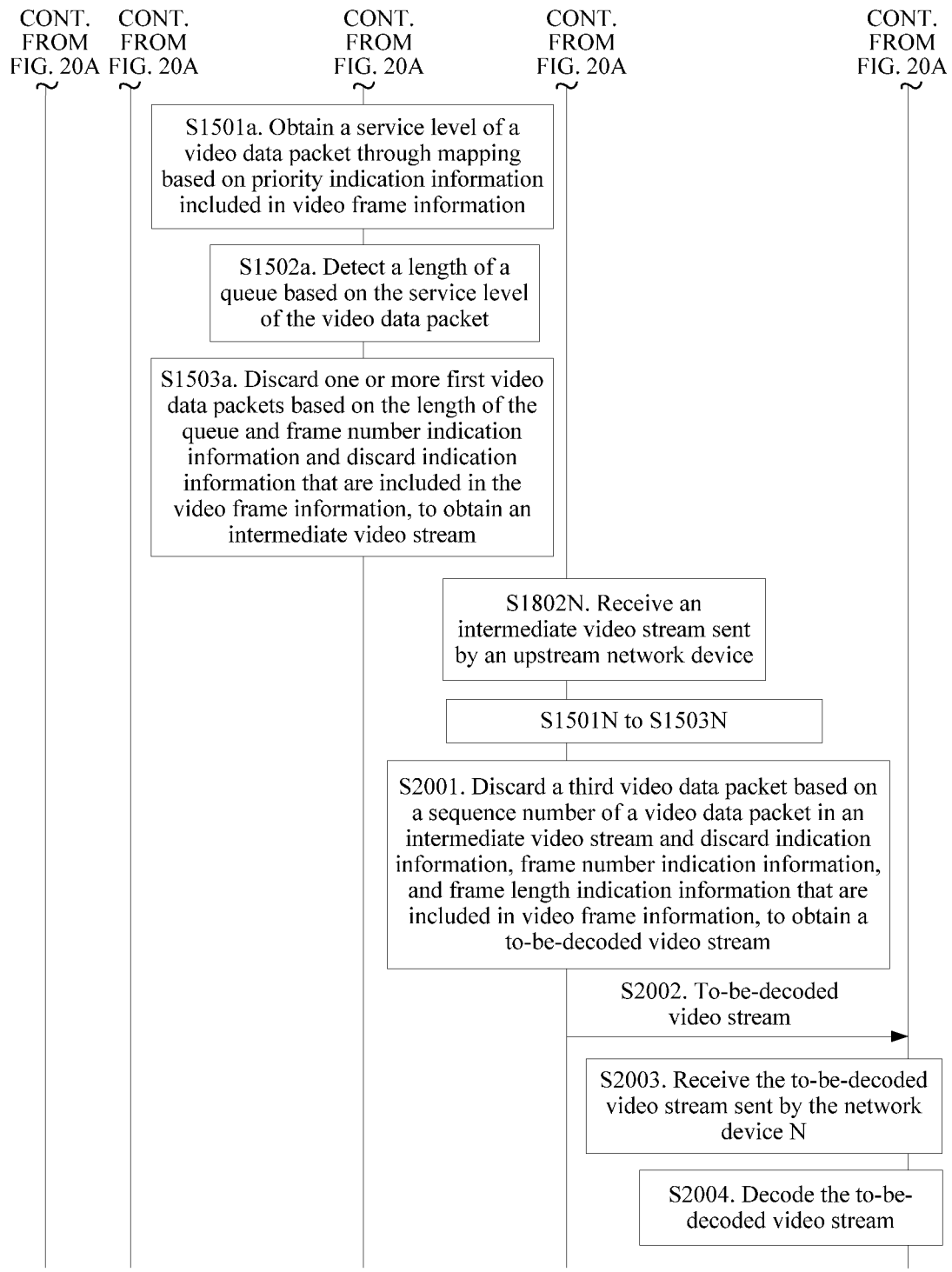
FIG. 20B is a continuation of the flowchart 7 of a video transmission method according to an embodiment of the present disclosure.

Specifically, the positioning assistant data sending method may further include step 2001 after step 603, that is, may further include step 2001 after step 901, step 1001 to step 1003, step 1201 to step 1203, or step 1501 to step 1503. FIG. 20A and FIG. 20B are a schematic flowchart of another video transmission method according to an embodiment of the present disclosure. In FIG. 20A and FIG. 20B, when the network device N in FIG. 18A and FIG. 18B is adjacent to the receiving device, the network device N may further perform step 2001 after step 1503N.

S2001. The network device N discards a third video data packet based on a sequence number of a video data packet in the intermediate video stream and discard indication information, frame number indication information, and frame length indication information that are included in video frame information, to obtain a to-be-decoded video stream.

Video data in an incomplete video frame whose frame type is the b frame is encapsulated into the third video data packet.

Sequence numbers of two consecutive video data packets received by the network device (for example, the network device N) are inconsecutive, and a value of discard indication information included in one video data packet (denoted as a to-be-checked video data packet) is 1. The network device collects statistics about to-be-checked video data packets and a quantity (denoted as Q) of video data packets that include same discard indication information and same frame number indication information in video data packets preceding and following the to-be-checked video data packet. If Q is different from frame length indication information in the to-be-checked video data packet, a b frame in which the to-be-checked video data packet is located is an incomplete video frame, and not all video data packets in the b frame are discarded. Then the network device discards remaining video data packets in the b frame in which the to-be-checked video data packet is located, to obtain a to-be-decoded video stream.

For example, FIG. 21A and FIG. 21B are a schematic diagram of another video stream according to an embodiment of the present disclosure. In FIG. 21A, two video data packets whose M has values of 5 and 9 are consecutive, a value of D in a video data packet whose M has a value of 9 is 1, and a value of B in the video data packet whose M has a value of 9 is 11, and in this case, the video data packet whose M has a value of 9 is a to-be-checked video data packet. In addition, the value of D in the video data packet whose M has a value of 9 is 1, and the value of B in the video data packet whose M has a value of 9 is 11, and in this case, a value of Q is 2. In FIG. 21A, a value of L in the video data packet whose M has a value of 9 is 5. In this case, Q is unequal to L. Therefore, the network device discards video data packets whose M has values of 9 and 10, to obtain a video stream shown in FIG. 21B, namely, a to-be-decoded video stream.

After obtaining the to-be-decoded video stream, the network device (for example, the network device N in FIG. 1) adjacent to the receiving device may perform step 2002 such that the receiving device can obtain the to-be-decoded video stream.

S2002. The network device N sends the to-be-decoded video stream to the receiving device.

With reference to FIG. 1 and FIG. 4, step 2002 may be performed by the communications interface 43 in the network device N.

It should be noted that when the sending device adds the video frame information using the A2SP protocol, the network device N adjacent to the receiving device may further remove an A2SP header in the video data packet before sending the video stream to the receiving device.

S2003. The receiving device receives the to-be-decoded video stream sent by the network device N.

With reference to FIG. 1 and FIG. 5, step 2003 may be performed by a communications interface 53 in the receiving device.

It should be noted that some receiving devices cannot apply the A2SP protocol, and therefore, the receiving devices cannot decode an A2SP header. In this case, if a video data packet received by the receiving device includes an A2SP header, the receiving device cannot decode the video data packet included in a received video stream, and therefore cannot obtain video data. Therefore, in this case, the network device (for example, the network device N) adjacent to the receiving device may perform the step of "removing an A2SP header in the video data packet".

S2004. The receiving device decodes the to-be-decoded video stream.

With reference to FIG. 1 and FIG. 5, step 2004 may be performed by the communications interface 53 in the receiving device.

It should be noted that the network device may discard a video data packet in an incomplete b frame such that quality of the video stream transmitted to the receiving device is relatively high. In this way, a possibility that a phenomenon such as artifacts or frame freezing occurs when the video stream is played on a device such as a television can be further reduced.

Figure 22A:
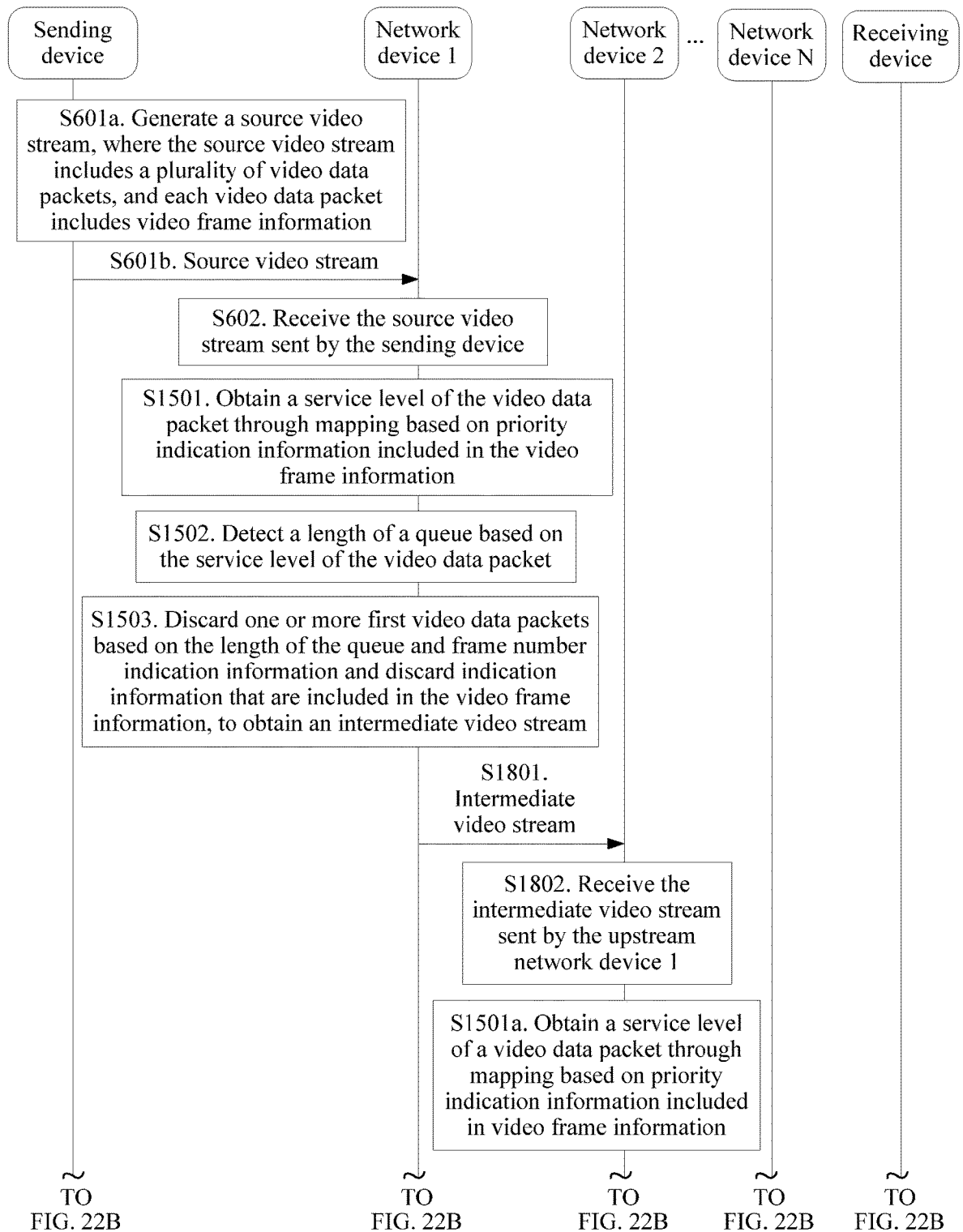
FIG. 22A is a flowchart 8 of a video transmission method according to an embodiment of the present disclosure.
Figure 22B:
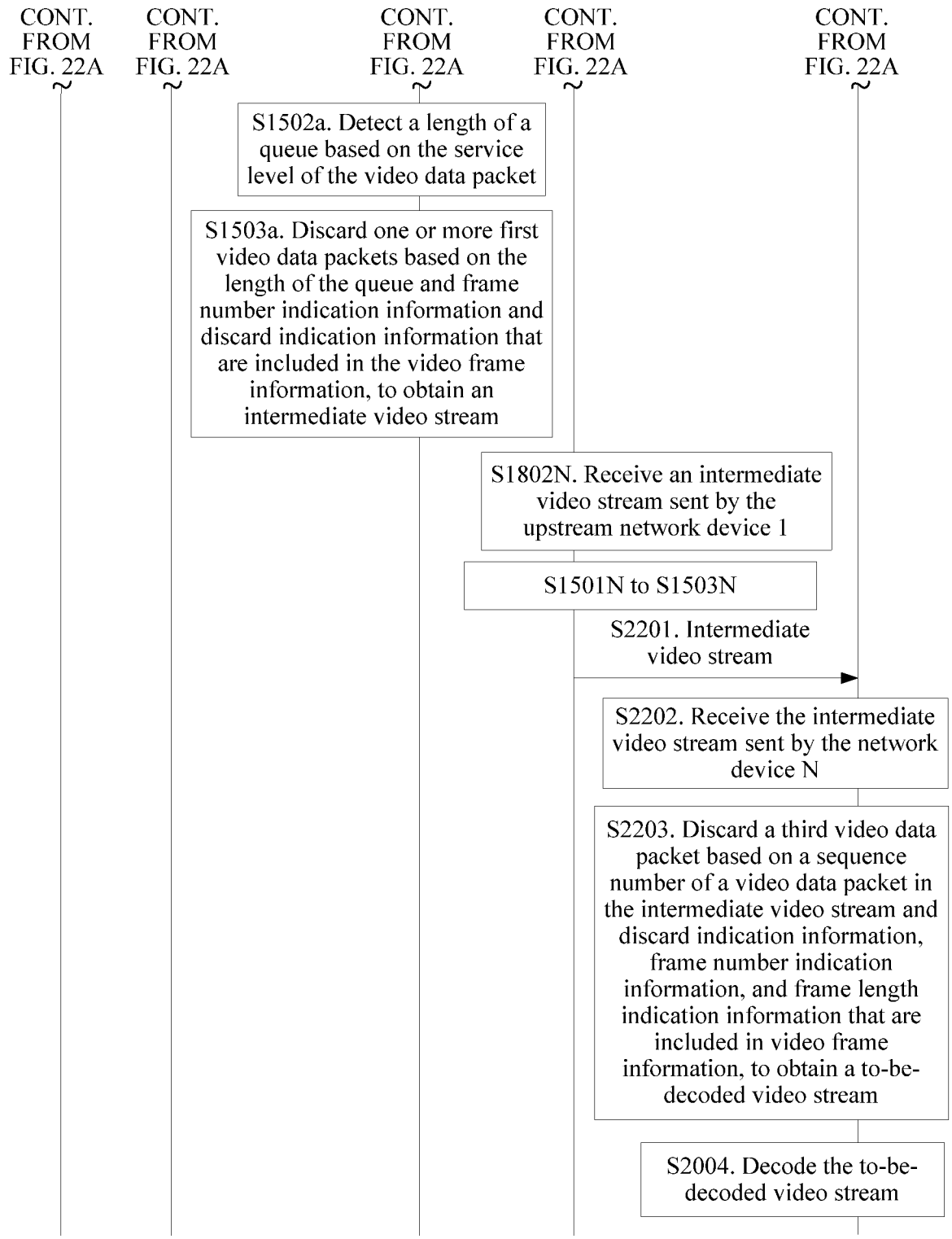
FIG. 22B is a continuation of the flowchart 8 of a video transmission method according to an embodiment of the present disclosure.

Further, in a possible implementation provided in this embodiment of the present disclosure, when the network device adjacent to the receiving device transmits the intermediate video to the receiving device, the method may further include step 2201 after step 603, that is, may further include step 2201 after step 901, step 1001 to step 1003, step 1201 to step 1203, or step 1501 to step 1503. FIG. 22A and FIG. 22B are a schematic flowchart of another video transmission method according to an embodiment of the present disclosure. In FIG. 22A and FIG. 22B, when the network device in FIG. 18A and FIG. 18B is adjacent to the receiving device, the network device may further perform step 2201 after step 1503.

S2201. The network device N sends the intermediate video stream to the receiving device.

With reference to FIG. 1 and FIG. 4, step 2201 may be performed by the communications interface 43 in the network device N.

S2202. The receiving device receives the intermediate video stream sent by the network device N.

With reference to FIG. 1 and FIG. 5, step 2202 may be performed by a communications interface 53 in the receiving device.

In this case, the receiving device in this embodiment of the present disclosure may be any receiving device that can receive and decode a video stream in the other approaches. The solution implemented in step 2001 in the foregoing embodiment may be implemented by the receiving device. The method shown in FIG. 22A and FIG. 22B may further include step 2203 after step 2202.

S2203. The receiving device discards a third video data packet based on a sequence number of a video data packet in the intermediate video stream and discard indication information, frame number indication information, and frame length indication information that are included in video frame information, to obtain a to-be-decoded video stream.

With reference to FIG. 1 and FIG. 5, step 2203 may be performed by a processor 51 in the receiving device.

For specific descriptions of step 2203, refer to the detailed descriptions of step 2001 in the foregoing embodiment. Details are not described again in this embodiment of the present disclosure.

It may be conceivable that after obtaining the to-be-decoded video stream, the receiving device may decode the to-be-decoded video stream. In other words, the method shown in FIG. 22A and FIG. 22B may further include step 2204 after step 2203.

It should be noted that the receiving device may discard a video data packet in an incomplete b frame such that quality of the video stream is relatively high. In this way, a possibility that a phenomenon such as artifacts or frame freezing occurs when the video stream is played on a device such as a television can be further reduced.

The foregoing mainly describes the solutions provided in the embodiments of the present disclosure from a perspective of interaction between network elements. It may be understood that to implement the foregoing functions, the network elements such as the sending device, the one or more network devices, and the receiving device include corresponding hardware structures and/or software modules for performing the functions. A person skilled in the art should easily be aware that, in combination with the examples described in the embodiments disclosed in this specification, units and algorithm steps may be implemented by hardware or a combination of hardware and computer software. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of the present disclosure.

In the embodiments of the present disclosure, the sending device, the network device, and the like may be divided into modules based on the foregoing method example. For example, each module may be obtained through division based on each corresponding function, or two or more functions may be integrated into one processing module. The integrated module may be implemented in a form of hardware, or may be implemented in a form of a software functional module. It should be noted that in the embodiments of the present disclosure, module division is an example, and is merely logical function division, and there may be other division in an embodiment.

Figure 23:
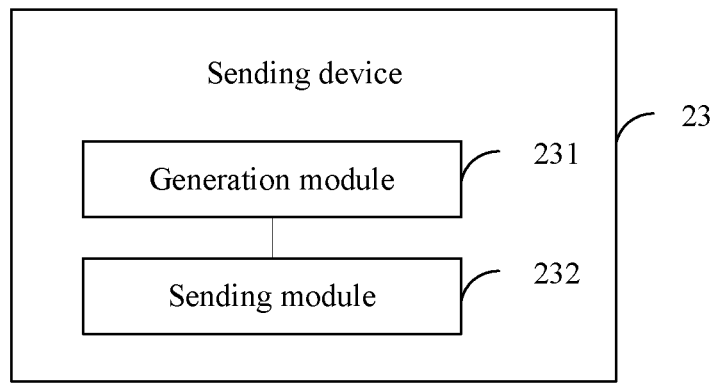
FIG. 23 is a schematic diagram 2 of composition of a sending device according to an embodiment of the present disclosure.

When each function module is obtained through division based on each corresponding function, FIG. 23 is a possible schematic diagram of composition of the sending device provided in the foregoing embodiments. As shown in FIG. 23, a sending device 23 may include a generation module 231 and a sending module 232. The generation module 231 is configured to support the sending device 23 in performing S601a in the foregoing embodiment, and/or another process used for the technology described in this specification. The sending module 232 is configured to support the sending device 23 in performing S601b in the foregoing embodiment, and/or another process used for the technology described in this specification.

When an integrated unit is used, the generation module 231 may be implemented by one processing module. The processing module may be a processor or a controller, for example, a CPU, a general-purpose processor, a digital signal processor (DSP), an ASIC, a FPGA, another programmable logic device, a transistor logic device, a hardware component, or any combination thereof. The processor/controller may implement or execute various illustrative logical blocks, modules, and circuits described with reference to content disclosed in the present disclosure. The processing unit may be a combination implementing a computing function, for example, a combination of one or more microprocessors or a combination of a DSP and a microprocessor. For example, the sending device 23 may further include a receiving module. The sending module 232 and the receiving module may be integrated into one communications interface. A storage module may be a memory.

With reference to the sending device shown in FIG. 3 in the foregoing embodiment, the processing module may be one or more processors such as the processor 31 and the processor 35 shown in FIG. 3. The storage module may be the memory 32 shown in FIG. 3. The sending module 232 may be implemented by the communications interface 33.

The communications bus 34 may be specifically a peripheral component interconnect (PCI) bus, an extended industry standard architecture (EISA) bus, or the like. The communications bus 34 may be classified into an address bus, a data bus, a control bus, and the like, and this is not limited in this embodiment of the present disclosure.

For detailed descriptions of the modules in the sending device 23 provided in this embodiment of the present disclosure and technical effects brought by the modules after the modules perform related method steps in the foregoing embodiments, refer to related descriptions in the method embodiments of the present disclosure. Details are not described herein again.

The one or more network devices in the transport network that are provided in the embodiments of the present disclosure may be the same. Therefore, only an example in which any one of the one or more network devices is divided into function modules is used for specific description in the embodiments of the present disclosure.

Figure 24:
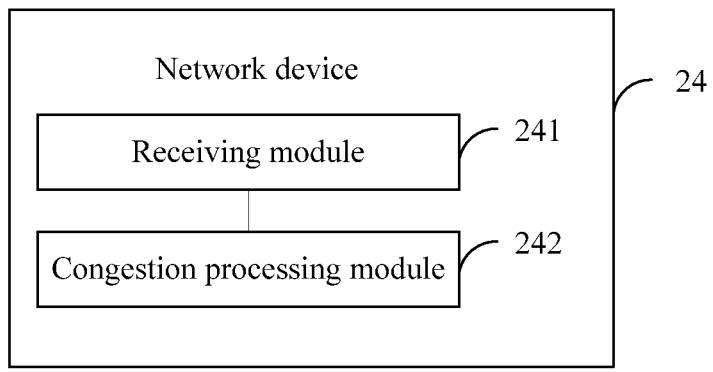
FIG. 24 is a schematic diagram 2 of composition of a network device according to an embodiment of the present disclosure.

When each function module is obtained through division based on each corresponding function, FIG. 24 is a possible schematic diagram of composition of the network device provided in the foregoing embodiments. As shown in FIG. 24, a network device 24 may include a receiving module 241 and a congestion processing module 242. The receiving module 241 is configured to support the network device 24 in performing S602, S1802, and S1802N in the foregoing embodiments, and/or another process used for the technology described in this specification. The congestion processing module 242 is configured to support the network device 24 in performing S603, S901, S1001, S1002, S1003, S1201, S1202, S1203, S1501, S1502, S1503, S603a, S901a, S1001a, S1002a, S1003a, S1201a, S1202a, S1203a, S1501a, S1502a, S1503a, S603N, S901N, S1001N, S1002N, S1003N, S1201N, S1202N, S1203N, S1501N, S1502N, and S1503N in the foregoing embodiments, and/or another process used for the technology described in this specification.

Figure 25:
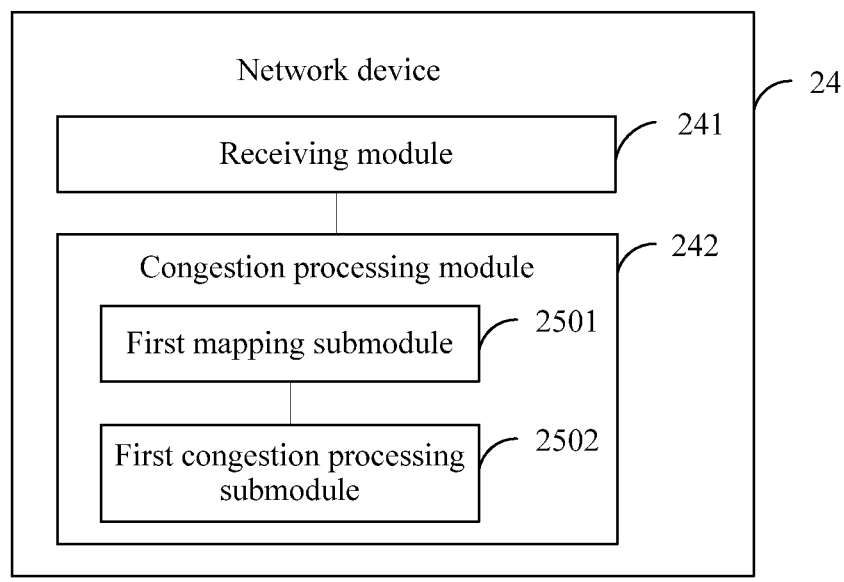
FIG. 25 is a schematic diagram 3 of composition of a network device according to an embodiment of the present disclosure.

Further, FIG. 25 is another possible schematic diagram of composition of the network device provided in the foregoing embodiments. As shown in FIG. 25, the congestion processing module 242 in the network device 24 may include a first mapping submodule 2501 and a first congestion processing module 2502. The first mapping submodule 2501 is configured to support the network device 24 in performing S1201, S1201a, and S1201N in the foregoing embodiments, and/or another process used for the technology described in this specification. The first congestion processing module 2502 is configured to support the network device 24 in performing S1202, S1203, S1202a, S1203a, S1202N, and S1203N in the foregoing embodiments, and/or another process used for the technology described in this specification.

Figure 26:
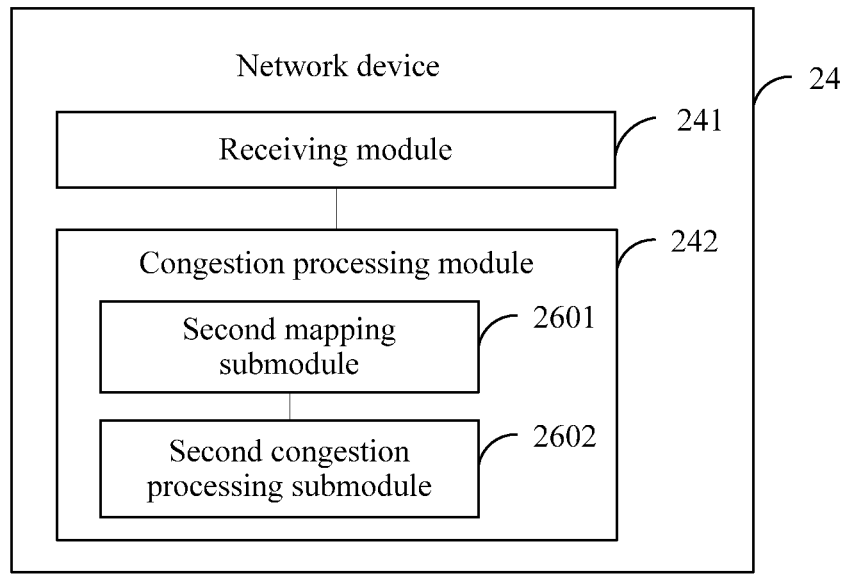
FIG. 26 is a schematic diagram 4 of composition of a network device according to an embodiment of the present disclosure.

Further, FIG. 26 is another possible schematic diagram of composition of the network device provided in the foregoing embodiments. As shown in FIG. 26, the congestion processing module 242 in the network device 24 may include a second mapping submodule 2601 and a second congestion processing module 2602. The second mapping submodule

2601 is configured to support the network device 24 in performing S1501, S1501a, and S1501N in the foregoing embodiments, and/or another process used for the technology described in this specification. The second congestion processing module 2602 is configured to support the network device 24 in performing S1502, S1503, S1502a, S1503a, S1502N, and S1503N in the foregoing embodiments, and/or another process used for the technology described in this specification.

Figure 27:
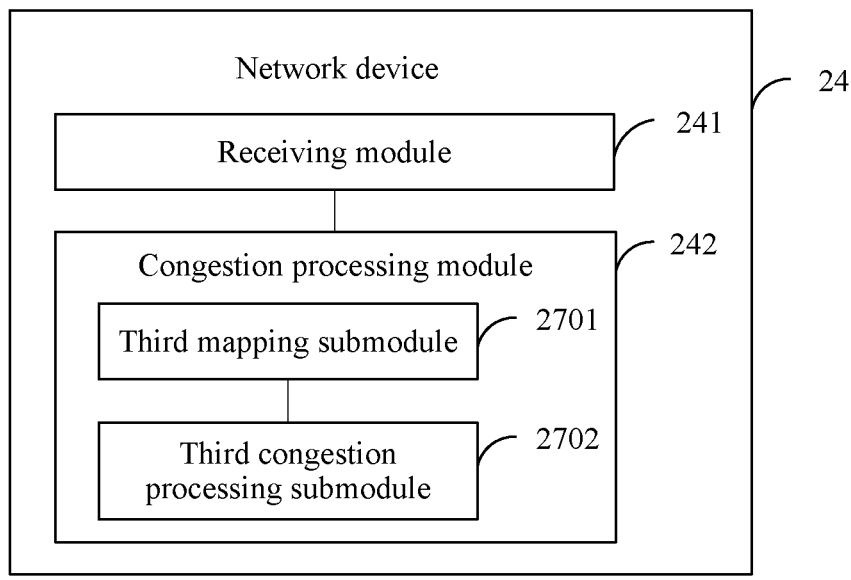
FIG. 27 is a schematic diagram 5 of composition of a network device according to an embodiment of the present disclosure.

Optionally, FIG. 27 is another possible schematic diagram of composition of the network device provided in the foregoing embodiments. As shown in FIG. 27, the congestion processing module 242 in the network device 24 may include a third mapping submodule 2701 and a third congestion processing module 2702. The third mapping submodule 2701 is configured to support the network device 24 in performing S1001, S1001a, and S1001N in the foregoing embodiments, and/or another process used for the technology described in this specification. The second congestion processing module 2602 is configured to support the network device 24 in performing S1002, S1003, S1002a, S1003a, S1002N, and S1003N in the foregoing embodiments, and/or another process used for the technology described in this specification.

Figure 28:
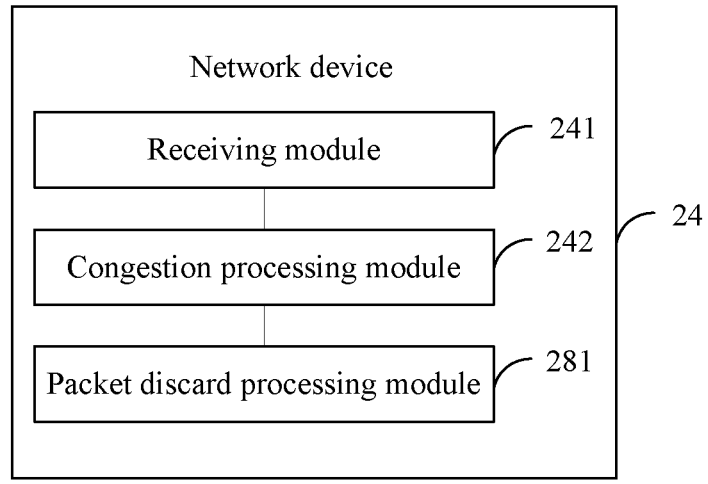
FIG. 28 is a schematic diagram 6 of composition of a network device according to an embodiment of the present disclosure.

Further, the network device 24 may include a packet discard processing module 281. For example, FIG. 28 is another possible schematic diagram of composition of the network device provided in the foregoing embodiments. As shown in FIG. 28, the network device 24 shown in FIG. 24 may further include the packet discard processing module 281. The packet discard processing module 281 is configured to support the network device 24 in performing S2001 in the foregoing embodiment, and/or another process used for the technology described in this specification.

Figure 29:
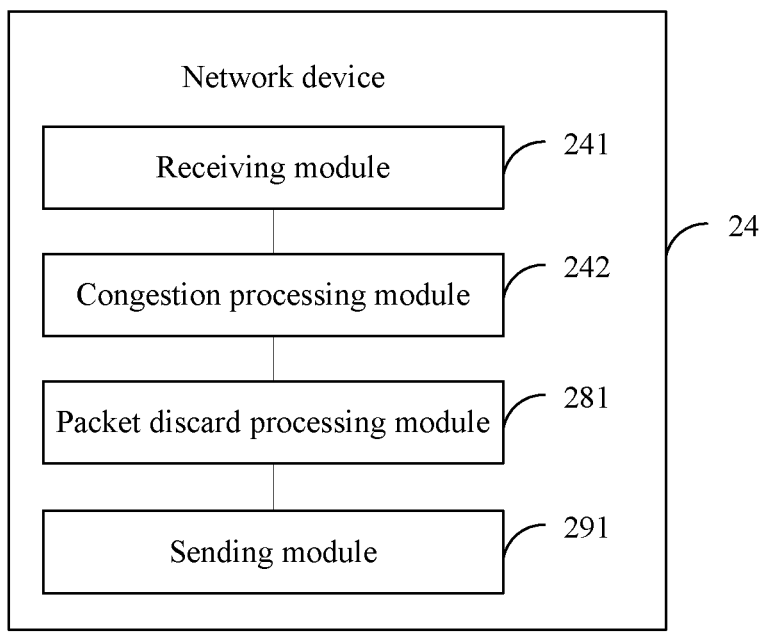
FIG. 29 is a schematic diagram 7 of composition of a network device according to an embodiment of the present disclosure.

Further, FIG. 29 is another possible schematic diagram of composition of the network device provided in the foregoing embodiments. As shown in FIG. 29, the network device 24 shown in FIG. 24 may further include a sending module 291. The sending module 291 is configured to support the network device 24 in performing S1801, S1801a, S2201, and S2002 in the foregoing embodiments, and/or another process used for the technology described in this specification.

When an integrated unit is used, the first mapping submodule 2501, the first congestion processing submodule 2502, the second mapping submodule 2601, the second congestion processing submodule 2602, and the like may be integrated into one processing module for implementation. The processing module may be a processor or a controller, for example, a CPU, a general-purpose processor, a DSP, an ASIC, an FPGA, another programmable logic device, a transistor logic device, a hardware component, or any combination thereof. The processor/controller may implement or execute various illustrative logical blocks, modules, and circuits described with reference to content disclosed in the present disclosure. The processing unit may be a combination implementing a computing function, for example, a combination of one or more microprocessors or a combination of a DSP and a microprocessor. The receiving module 241 and the sending module 291 may be integrated into one communications interface. A storage module may be a memory.

With reference to the network device shown in FIG. 4 in the foregoing embodiment, the processing module may be one or more processors such as the processor 41 and the processor 45 shown in FIG. 4. Any one of the foregoing mapping submodules may be implemented by the NP shown in FIG. 4, and any one of the congestion management submodules may be implemented by the TM shown in FIG. 4. The storage module may be the memory 42 shown in FIG. 4. The receiving module 241, a first sending module 291, and a second sending module 292 may be integrated into the communications interface 43.

The communications bus 44 may be specifically a PCI bus, an EISA bus, or the like. The communications bus 44 may be classified into an address bus, a data bus, a control bus, and the like, and this is not limited in this embodiment of the present disclosure.

For detailed descriptions of the modules in the network device 24 provided in this embodiment of the present disclosure and technical effects brought by the modules after the modules perform related method steps in the foregoing embodiments, refer to related descriptions in the method embodiments of the present disclosure. Details are not described herein again.

Figure 30:
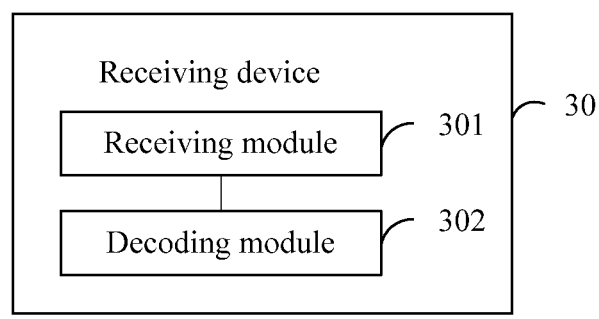
FIG. 30 is a schematic diagram 2 of composition of a receiving device according to an embodiment of the present disclosure.

When each function module is obtained through division based on each corresponding function, FIG. 30 is a possible schematic diagram of composition of the receiving device provided in the foregoing embodiments. As shown in FIG. 30, a receiving device 30 may include a receiving module 301 and a decoding module 302. The receiving module 301 is configured to support the receiving device 30 in performing S2003 and S2202 in the foregoing embodiments, and/or another process used for the technology described in this specification. The decoding module 302 is configured to support the receiving device 30 in performing S2004 in the foregoing embodiment, and/or another process used for the technology described in this specification.

Figure 31:
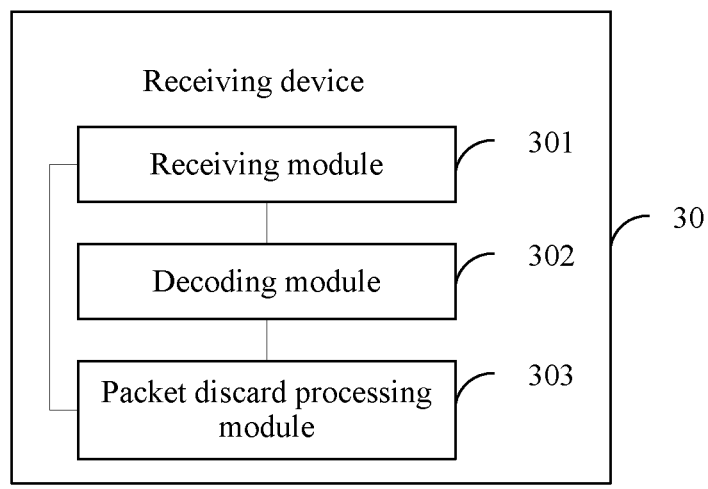
FIG. 31 is a schematic diagram 3 of composition of a receiving device according to an embodiment of the present disclosure.

Further, FIG. 31 is another possible schematic diagram of composition of the receiving device provided in the foregoing embodiments. As shown in FIG. 31, the receiving device 30 may further include a packet discard processing module 303. The packet discard processing module 303 is configured to support the receiving device 30 in performing S2203 in the foregoing embodiment, and/or another process used for the technology described in this specification.

When an integrated unit is used, the decoding module 301, the packet discard processing module 303, and the like may be integrated into one processing module for implementation. The processing module may be a processor or a controller, for example, a CPU, a general-purpose processor, a DSP, an ASIC, an FPGA, another programmable logic device, a transistor logic device, a hardware component, or any combination thereof. The processor/controller may implement or execute various illustrative logical blocks, modules, and circuits described with reference to content disclosed in the present disclosure. The processing unit may be a combination implementing a computing function, for example, a combination of one or more microprocessors or a combination of a DSP and a microprocessor. The receiving module 301 may be implemented by a communications interface. A storage module may be a memory.

With reference to the receiving device shown in FIG. 5 in the foregoing embodiment, the processing module may be one or more processors such as the processor 51 and the processor 55 shown in FIG. 5. The storage module may be the memory 52 shown in FIG. 5. The receiving module 301 may be implemented by the communications interface 53.

The communications bus 54 may be specifically a PCI bus, an EISA bus, or the like. The communications bus 44 may be classified into an address bus, a data bus, a control bus, and the like, and this is not limited in this embodiment of the present disclosure.

For detailed descriptions of the modules in the receiving device 30 provided in this embodiment of the present disclosure and technical effects brought by the modules after the modules perform related method steps in the foregoing embodiments, refer to related descriptions in the method embodiments of the present disclosure. Details are not described herein again.

The foregoing descriptions about implementations allow a person skilled in the art to clearly understand that, for the purpose of convenient and brief description, only division of the foregoing function modules is used as an example for illustration. In an embodiment, the foregoing functions can be allocated to different function modules and implemented based on a requirement, in other words, an inner structure of an apparatus is divided into different function modules to implement all or some of the functions described above. For a detailed working process of the foregoing system, apparatus, and unit, refer to a corresponding process in the foregoing method embodiments. Details are not described herein again.

In the several embodiments provided in this application, it should be understood that the disclosed system, apparatus, and method may be implemented in other manners. For example, the described apparatus embodiment is merely an example. For example, the module or unit division is merely logical function division and there may be other division in an embodiment. For example, a plurality of units or components may be combined or integrated into another system, or some features may be ignored or not performed. In addition, the displayed or discussed mutual couplings or direct couplings or communication connections may be implemented using some interfaces. The indirect couplings or communication connections between the apparatuses or units may be implemented in electronic, mechanical, or other forms.

The units described as separate parts may or may not be physically separate, and parts displayed as units may or may not be physical units, and may be located in one position, or may be distributed on a plurality of network units. Some or all of the units may be selected based on actual requirements to achieve the objectives of the solutions of the embodiments.

In addition, functional units in the embodiments of this application may be integrated into one processing unit, or each of the units may exist alone physically, or two or more units may be integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of this application essentially, or the part contributing to the other approaches, or all or some of the technical solutions may be implemented in a form of a software product. The computer software product is stored in a storage medium and includes several instructions for instructing a computer device (which may be a personal computer, a server, a network device, or the like) or a processor to perform all or some of the steps of the methods described in the embodiments of this application. The foregoing storage medium includes any medium that can store program code, for example, a flash memory, a removable hard disk, a ROM, a RAM, a magnetic disk, or an optical disc.

The foregoing descriptions are merely specific implementations of this application, but are not intended to limit the protection scope of this application. Any variation or replacement within the technical scope disclosed in this application shall fall within the protection scope of this application. Therefore, the protection scope of this application shall be subject to the protection scope of the claims.

What is claimed is:

1. A video transmission method, implemented by a sending device, wherein the video transmission method comprises:
generating a source video stream, wherein the source video stream comprises a plurality of video data packets, wherein each of the video data packets comprises a packet comprising a header and a real-time transport protocol (RTP) data packet, and wherein each of the video data packets comprises:
video frame information carried in the header, wherein the video frame information comprises discard indication information that indicates a discard priority of the video data packets, frame number indication information that indicates a number of a video frame in which each of the video data packets is located, and frame length indication information that indicates a quantity of video data packets comprised in the video frame in which each of the video data packets is located; and
video data of a video frame, wherein the video data packets comprise:
a first video data packet comprising first discard indication information indicating a first discard priority of the first video data packet; and
a second video data packet comprising second discard indication information indicating a second discard priority of the second video data packet, wherein the first discard priority is higher than the second discard priority, wherein the video data in the video frame whose frame type is a non-reference B frame is encapsulated into the first video data packet, and wherein the video data in the video frame whose frame type is an I frame, a P frame, or a reference B frame is encapsulated into the second video data packet; and
sending the source video stream to a network device to permit the network device to obtain a service level of a plurality of queues by mapping based on the discard indication information, wherein the service level indicates a transmission order of transmitting the one or more data packets from each of the queues.

2. The video transmission method of claim 1, wherein the video data in only one video frame is encapsulated into each of the video data packets.

3. The video transmission method of claim 1, wherein the video frame information further comprises priority indication information that indicates a transmission priority of each of the video data packets.

4. The video transmission method of claim 1, wherein each of the video data packets comprises an application aware substrate protocol (A2SP) packet comprising an A2SP header and the RTP data packet, wherein the RTP data packet comprises an RTP header and a video data part, wherein the video data part carries the video data, wherein the A2SP header carries the video frame information, and wherein the RTP data packet is used as a payload of the A2SP packet.

5. The video transmission method of claim 1, wherein each of the video data packets further comprises a sequence number of each of the video data packets.

6. A video transmission method, implemented by a network device, wherein the video transmission method comprises:

receiving a video stream, wherein the video stream comprises a plurality of video data packets, wherein each of the video data packets comprise a packet comprising a header and a real-time transport protocol (RTP) data packet, and wherein each of the video data packets comprises:
  video frame information carried in the header, wherein the video frame information comprises discard indication information, frame number indication information, and frame length indication information, wherein the discard indication information indicates a discard priority of the video data packets, wherein the frame number indication information indicates a number of a video frame in which each of the video data packets is located, and wherein the frame length indication information indicates a quantity of video data packets comprised in the video frame in which each of the video data packets is located; and
  video data of a video frame;
obtaining a service level of the video data packets through mapping based on the discard indication information, wherein the service level indicates a transmission order for a plurality of queues through which the network device transmits the video data packets from each of the plurality of queues,
wherein the video data packets comprise:
  a first video data packet comprising first discard indication information indicating a first discard priority of the first video data packet; and
  a second video data packet comprising second discard indication information indicating a second discard priority of the second video data packet, wherein the first discard priority is higher than the second discard priority, and wherein the video data in the video frame whose frame type is a non-reference B frame is encapsulated into the first video data packet, wherein the video data in the video frame whose frame type is an I frame, a P frame, or a reference B frame is encapsulated into the second video data packet; and
discarding one or more video data packets based on the service level of the video data packet when a network is congested to obtain an intermediate video stream based on the service level.

7. The video transmission method of claim 6, wherein the video data in only one video frame is encapsulated into each of the video data packets.

8. The video transmission method of claim 6, wherein discarding the one or more video data packets further comprises:
  obtaining a color of the video data packets through mapping based on the discard indication information and priority indication information in the video frame information, wherein the color indicates a discard level of the video data packets, and wherein the priority indication information indicates a transmission priority of the video data packets; and
  discarding the one or more video data packets based on the color when the network is congested.

9. The video transmission method of claim 6, wherein discarding the one or more video data packets based on the discard indication information when the network is congested comprises discarding the one or more video data packets based on the frame number indication information that are comprised in the video frame information when the network is congested.

10. The video transmission method of claim 9, wherein discarding the one or more video data packets when the network is congested comprises:
  detecting a length of the plurality of queues based on the service level of each of the video data packets; and
  discarding the one or more video data packets to obtain an intermediate video stream based on the length of the plurality of queues comprised in the video frame information.

11. The video transmission method of claim 6, wherein the video frame information further comprises frame length indication information, wherein the frame length indication information indicates a quantity of video data packets comprised in the video frame in which each of the video data packets is located, wherein each of the video data packets further comprises a sequence number of each of the video data packets wherein after discarding the one or more video data packets based on the video frame information when the network is congested, and wherein the video transmission method further comprises:
  discarding a third video data packet to obtain a to-be-decoded video stream comprising video frames based on the sequence number of each of the video data packets in an intermediate video stream and the discard indication information, a frame number indication information, and the frame length indication information that are comprised in the video frame information when the network device is adjacent to a receiving device, wherein the third video data packet is a packet into which the video data in an incomplete video frame whose frame type is the non-reference B frame is encapsulated, wherein the video frames in the to-be-decoded video stream are complete video frames; and
  sending the to-be-decoded video stream to the receiving device.

12. The video transmission method of claim 6, wherein each of the video data packets comprises an application aware substrate protocol (A2SP) packet comprising an A2SP header and the RTP data packet, wherein the RTP data packet comprises an RTP header and a video data part, wherein the video data part carries the video data, wherein the A2SP header carries the video frame information, and wherein the RTP data packet is used as a payload of the A2SP packet.

13. The video transmission method of claim 6, wherein the video frame information comprises priority indication information, and wherein the priority indication information indicates a transmission priority of the video data packets.

14. A sending device, comprising:
  a communications interface;
  a processor coupled to the communications interface; and
  a memory coupled to the communications interface and the processor and storing instructions that, when executed by the processor, cause the sending device to be configured to:
    generate a source video stream, wherein the source video stream comprises a plurality of video data packets, wherein each of the video data packets comprises:
      video frame information, wherein the video frame information comprises discard indication information that indicates a discard priority of the video data packets, frame number indication information that indicates a number of a video frame in which each of the video data packets is located, and frame length indication information that indicates a quantity of video data packets comprised in the video frame in which each of the video data packets is located; and video data of a video frame, wherein the video data packets comprise:
  a first video data packet comprising first discard indication information indicating a first discard priority of the first video data packet; and
  a second video data packet comprising second discard indication information indicating a second discard priority of the second video data packet, wherein the first discard priority is higher than the second discard priority indicated by discard indication information comprised in the second video data packet, wherein the video data in the video frame whose frame type is a non-reference B frame is encapsulated into the first video data packet, and wherein the video data in the video frame whose frame type is an I frame, a P frame, or a reference B frame is encapsulated into the second video data packet; and send the source video stream to a network device to permit the network device to obtain a service level of a plurality of queues by mapping based on the discard indication information, wherein the service level indicates a transmission order of transmitting the one or more data packets from each of the queues.

15. The sending device of claim 14, wherein the video frame information further comprises priority indication information that indicates a transmission priority of the video data packets.

16. A network device, comprising:
a communications interface configured to receive a video stream, wherein the video stream comprises a plurality of video data packets, wherein the video data packets comprise a packet comprising a header and a real-time transport protocol (RTP) data packet, wherein each video data packet comprises:
  video frame information carried in the header, wherein the video frame information comprises discard indication information, frame number indication information, and frame length indication information, wherein the discard indication information indicates a discard priority of the video data packets, wherein the frame number indication information indicates a number of a video frame in which each of the video data packets is located, and wherein the frame length indication information indicates a quantity of video data packets comprised in the video frame in which each of the video data packets is located; and
  a video frame comprising video data, wherein the video data packets comprise:
    a first video data packet comprising first discard indication information indicating a first discard priority of the first video data packet; and
    a second video data packet comprising second discard indication information indicating a second discard priority of the second video data packet, wherein the first discard priority is higher than the second discard priority indicated by discard indication information comprised in the second video data packet, wherein the video data in the video frame whose frame type is a non-reference B frame is encapsulated into the first video data packet, and wherein the video data in the video frame whose frame type is an I frame, a P frame, or a reference B frame is encapsulated into the second video data packet; and
a processor coupled to the communications interface; and
a memory coupled to the communications interface and the processor and storing instructions that, when executed by the processor, cause the network device to be configured to:
  obtain a service level of the video data packets through mapping based on the discard indication information, wherein the service level indicates a transmission order for a plurality of queues through which the network device transmits the video data packets from the plurality of queues; and
  discard one or more video data packets based on the service level of the video data packets when a network is congested to obtain an intermediate video stream based on the service level.

17. The network device of claim 16, wherein each of the video data packets comprises an application aware substrate protocol (A2SP) packet comprising an A2SP header and the RTP data packet, wherein the RTP data packet comprises an RTP header and a video data part, wherein the video data part carries the video data, wherein the A2SP header carries the video frame information, and wherein the RTP data packet is used as a payload of the A2SP packet.

18. The network device of claim 16, wherein the video data in only one video frame is encapsulated into each of the video data packets.

19. The network device of claim 16, wherein discarding one or more of the video data packets based on the discard indication information when the network is congested comprises discarding one or more of the video data packets based on the frame number indication information that are comprised in the video frame information when the network is congested.

20. The network device of claim 16, wherein the video frame information comprises priority indication information, and wherein the priority indication information indicates a transmission priority of the video data packets.

* * * * *